United States Patent
Jack et al.

(10) Patent No.: US 10,429,712 B2
(45) Date of Patent: Oct. 1, 2019

(54) ANGLED BUS BAR

(75) Inventors: Gordon Jack, Santa Clara, CA (US);
Anshu Pradhan, Fremont, CA (US);
Kaustubh Nadkarni, Sunnyvale, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 13/452,032

(22) Filed: Apr. 20, 2012

(65) Prior Publication Data

US 2013/0278988 A1  Oct. 24, 2013

(51) Int. Cl.
*G02F 1/163* (2006.01)
*B05D 5/12* (2006.01)
*G02F 1/155* (2006.01)

(52) U.S. Cl.
CPC .................... *G02F 1/155* (2013.01)

(58) Field of Classification Search
CPC ...... G02F 1/155; G02F 1/1525; G02F 1/1523; G02B 5/32
USPC .......... 359/265, 266, 270, 275, 900; 427/58; 174/250
See application file for complete search history.

(56) References Cited

U.S. PATENT DOCUMENTS

| | | |
|---|---|---|
| 4,878,743 A | 11/1989 | Aikawa et al. |
| 5,076,673 A | 12/1991 | Lynam et al. |
| 5,140,455 A | 8/1992 | Varaprasad et al. |
| 5,142,407 A | 8/1992 | Varaprasad et al. |
| 5,145,609 A | 9/1992 | Varaprasad et al. |
| 5,151,816 A | 9/1992 | Varaprasad et al. |
| 5,187,607 A | 2/1993 | Endo et al. |
| 5,233,461 A | 8/1993 | Dornan et al. |
| 5,239,405 A | 8/1993 | Varaprasad et al. |
| 5,340,503 A | 8/1994 | Varaprasad et al. |
| 5,379,146 A | 1/1995 | Defendini |
| 5,471,338 A | 11/1995 | Yu et al. |

(Continued)

FOREIGN PATENT DOCUMENTS

| | | |
|---|---|---|
| CN | 1936711 A | 3/2007 |
| CN | 102460291 A | 5/2012 |

(Continued)

OTHER PUBLICATIONS

U.S. Appl. No. 13/326,168, filed Dec. 14, 2011, entitled "Connectors for Smart Windows".

(Continued)

*Primary Examiner* — Jie Lei
(74) *Attorney, Agent, or Firm* — Weaver Austin Villeneuve & Sampson LLP; Brian D. Griedel

(57) ABSTRACT

This disclosure provides configurations, methods of use, and methods of fabrication for a bus bar of an optically switchable device. In one aspect, an apparatus includes a substrate and an optically switchable device disposed on a surface of the substrate. The optically switchable device has a perimeter with at least one corner including a first side, a second side, and a first vertex joining the first side and the second side. A first bus bar and a second bus bar are affixed to the optically switchable device and configured to deliver current and/or voltage for driving switching of the device. The first bus bar is proximate to the corner and includes a first arm and a second arm having a configuration that substantially follows the shape of the first side, the first vertex, and the second side of the corner.

25 Claims, 25 Drawing Sheets

(56) References Cited

U.S. PATENT DOCUMENTS

| | | |
|---|---|---|
| 5,472,643 A | 12/1995 | Varaprasad et al. |
| 5,500,760 A | 3/1996 | Varaprasad et al. |
| 5,567,360 A | 10/1996 | Varaprasad et al. |
| 5,657,149 A | 8/1997 | Buffat et al. |
| 5,657,150 A | 8/1997 | Kallman et al. |
| 5,668,663 A | 9/1997 | Varaprasad et al. |
| 5,724,175 A | 3/1998 | Hichwa et al. |
| 5,724,187 A | 3/1998 | Varaprasad et al. |
| 5,805,330 A | 9/1998 | Byker et al. |
| 5,805,367 A | 9/1998 | Kanazawa |
| 5,953,150 A | 9/1999 | Smarto et al. |
| 5,969,847 A | 10/1999 | Coleman et al. |
| 5,985,184 A | 11/1999 | Lynam |
| 5,995,271 A | 11/1999 | Zieba et al. |
| 6,001,487 A | 12/1999 | Ladang et al. |
| 6,002,511 A | 12/1999 | Varaprasad et al. |
| 6,031,201 A | 2/2000 | Amako et al. |
| 6,045,643 A | 4/2000 | Byker et al. |
| 6,045,896 A | 4/2000 | Boire et al. |
| 6,055,088 A | 4/2000 | Fix et al. |
| 6,055,089 A | 4/2000 | Schulz et al. |
| 6,118,573 A | 9/2000 | Kubo et al. |
| 6,143,209 A | 11/2000 | Lynam |
| 6,154,306 A | 11/2000 | Varaprasad et al. |
| 6,166,849 A | 12/2000 | Coleman et al. |
| 6,204,953 B1 | 3/2001 | Zieba et al. |
| 6,207,083 B1 | 3/2001 | Varaprasad et al. |
| 6,244,716 B1 | 6/2001 | Steenwyk et al. |
| 6,261,641 B1 | 7/2001 | Zieba et al. |
| 6,337,758 B1 | 1/2002 | Beteille et al. |
| 6,433,913 B1 | 8/2002 | Bauer et al. |
| 6,471,360 B2 | 10/2002 | Rukavina et al. |
| 6,515,787 B1 | 2/2003 | Westfall et al. |
| 6,529,308 B2 | 3/2003 | Beteille et al. |
| 6,535,126 B2 | 3/2003 | Lin et al. |
| 6,559,411 B2 | 5/2003 | Borgeson et al. |
| 6,561,460 B2 | 5/2003 | Rukavina et al. |
| 6,783,099 B2 | 8/2004 | Rukavina et al. |
| 6,795,226 B2 | 9/2004 | Agrawal et al. |
| 6,798,556 B2 | 9/2004 | Tench et al. |
| 6,822,778 B2 | 11/2004 | Westfall et al. |
| 6,853,472 B2 | 2/2005 | Warner et al. |
| 6,862,125 B2 | 3/2005 | Warner et al. |
| 6,919,530 B2 | 7/2005 | Borgeson et al. |
| 6,995,891 B2 | 2/2006 | Agrawal et al. |
| 7,002,720 B2 | 2/2006 | Beteille et al. |
| 7,004,592 B2 | 2/2006 | Varaprasad et al. |
| 7,033,655 B2 | 4/2006 | Beteille et al. |
| 7,130,101 B2 | 10/2006 | Rukavina et al. |
| 7,133,181 B2 | 11/2006 | Greer |
| 7,173,750 B2 | 2/2007 | Rukavina |
| 7,202,987 B2 | 4/2007 | Varaprasad et al. |
| 7,230,748 B2 | 6/2007 | Giron et al. |
| 7,248,392 B2 | 7/2007 | Rukavina et al. |
| 7,277,215 B2 | 10/2007 | Greer |
| 7,300,166 B2 | 11/2007 | Agrawal et al. |
| 7,317,106 B2 | 1/2008 | Warner et al. |
| 7,324,261 B2 | 1/2008 | Tonar et al. |
| 7,362,491 B2 | 4/2008 | Busick et al. |
| 7,477,439 B2 * | 1/2009 | Tonar et al. ............... 359/267 |
| 7,531,101 B2 | 5/2009 | Beteille |
| 7,710,671 B1 | 5/2010 | Kwak et al. |
| 7,719,751 B2 | 5/2010 | Egerton et al. |
| 7,869,114 B2 | 1/2011 | Valentin et al. |
| 7,894,119 B2 | 2/2011 | Valentin et al. |
| 7,929,194 B2 | 4/2011 | Legois et al. |
| 7,952,785 B2 | 5/2011 | Karmhag et al. |
| 8,035,882 B2 | 10/2011 | Fanton et al. |
| 2002/0021481 A1 | 2/2002 | Lin et al. |
| 2002/0041443 A1 | 4/2002 | Varaprasad et al. |
| 2002/0075552 A1 | 6/2002 | Poll et al. |
| 2002/0135881 A1 | 9/2002 | Rukavina et al. |
| 2002/0149829 A1 | 10/2002 | Mochizuka et al. |
| 2003/0227663 A1 | 12/2003 | Agrawal et al. |
| 2004/0047050 A1 | 3/2004 | Bauer et al. |
| 2004/0257633 A1 | 12/2004 | Agrawal et al. |
| 2005/0002081 A1 | 1/2005 | Beteille et al. |
| 2006/0077511 A1 | 4/2006 | Poll et al. |
| 2006/0187608 A1 | 8/2006 | Stark |
| 2006/0283084 A1 | 12/2006 | Johnson |
| 2007/0002422 A1 | 1/2007 | O'Shaughnessy |
| 2007/0020442 A1 | 1/2007 | Giron et al. |
| 2007/0067048 A1 | 3/2007 | Bechtel et al. |
| 2007/0103761 A1 | 5/2007 | Giron et al. |
| 2007/0133078 A1 | 6/2007 | Fanton et al. |
| 2007/0248756 A1 | 10/2007 | Krisko et al. |
| 2008/0074724 A1 | 3/2008 | Agrawal et al. |
| 2008/0115428 A1 | 5/2008 | Schlam et al. |
| 2009/0058295 A1 | 3/2009 | Auday et al. |
| 2009/0067031 A1 | 3/2009 | Piroux et al. |
| 2009/0097098 A1 | 4/2009 | Piroux |
| 2009/0110918 A1 | 4/2009 | Jacquiod et al. |
| 2009/0114928 A1 | 5/2009 | Messere et al. |
| 2009/0130409 A1 | 5/2009 | Reutler et al. |
| 2009/0148642 A1 | 6/2009 | Mauser et al. |
| 2009/0174300 A1 | 7/2009 | Jousse et al. |
| 2009/0181203 A1 | 7/2009 | Valentin et al. |
| 2009/0251758 A1 | 10/2009 | Valentin et al. |
| 2009/0262411 A1 | 10/2009 | Karmhag et al. |
| 2009/0297806 A1 | 12/2009 | Dawson-Elli et al. |
| 2009/0323160 A1 | 12/2009 | Egerton et al. |
| 2010/0062975 A1 | 3/2010 | Houck |
| 2010/0062976 A1 | 3/2010 | Naicker et al. |
| 2010/0067090 A1 | 3/2010 | Egerton et al. |
| 2010/0208326 A1 | 8/2010 | Kwak et al. |
| 2010/0243427 A1 | 9/2010 | Kozlowski et al. |
| 2011/0043885 A1 | 2/2011 | Lamine et al. |
| 2011/0048614 A1 | 3/2011 | Veerasamy |
| 2011/0051221 A1 | 3/2011 | Veerasamy |
| 2011/0059275 A1 | 3/2011 | Stark |
| 2011/0216389 A1 | 9/2011 | Piroux et al. |
| 2011/0260961 A1 | 10/2011 | Burdis |
| 2011/0267672 A1 | 11/2011 | Sbar et al. |
| 2011/0299149 A1 | 12/2011 | Park et al. |
| 2012/0019889 A1 | 1/2012 | Lamine et al. |
| 2012/0026573 A1 | 2/2012 | Collins et al. |
| 2012/0062975 A1 | 3/2012 | Mehtani et al. |
| 2012/0062976 A1 | 3/2012 | Burdis |
| 2012/0147449 A1 | 6/2012 | Bhatnagar et al. |
| 2012/0194895 A1 | 8/2012 | Podbelski et al. |
| 2012/0200908 A1 | 8/2012 | Bergh et al. |
| 2012/0300280 A1 | 11/2012 | Murphy et al. |
| 2012/0327499 A1 | 12/2012 | Parker et al. |
| 2013/0016417 A1 | 1/2013 | Veerawamy |
| 2013/0032084 A1 | 2/2013 | Sivaramakrishnan et al. |
| 2013/0037992 A1 | 2/2013 | Milstein et al. |
| 2013/0258436 A1 | 10/2013 | Podbelski et al. |
| 2014/0007418 A1 | 1/2014 | Song et al. |
| 2014/0133005 A1 | 5/2014 | Sbar et al. |
| 2016/0097960 A1 | 4/2016 | Dixit et al. |
| 2019/0011793 A1 | 1/2019 | Jack et al. |

FOREIGN PATENT DOCUMENTS

| | | |
|---|---|---|
| CN | 102460292 A | 5/2012 |
| CN | 102460292 A | 5/2012 |
| CN | 103238107 A | 8/2013 |
| CN | 103370649 A | 10/2013 |
| CN | 103492940 A | 1/2014 |
| DE | 10 2006 042 538 | 3/2008 |
| EP | 0356099 A2 | 2/1990 |
| EP | 0470867 | 2/1992 |
| EP | 0851271 A2 | 7/1998 |
| EP | 0950568 A1 | 10/1999 |
| EP | 2011-193364 | 7/2001 |
| EP | 1420287 A1 | 5/2004 |
| EP | 2 348 357 | 7/2011 |
| GB | 2190760 A | 11/1987 |
| KR | 10-2012-0038439 A | 4/2012 |
| TW | 201235757 A | 9/2012 |
| WO | WO 2005/076061 | 8/2005 |
| WO | WO2007/100921 A2 | 9/2007 |
| WO | WO 2008/043951 | 4/2008 |
| WO | WO 2009/145876 | 12/2009 |

(56) References Cited

FOREIGN PATENT DOCUMENTS

| WO | WO 2009/148861 | 12/2009 |
|----|----------------|---------|
| WO | WO 2011/010067 | 1/2011 |
| WO | WO 2011/028253 | 3/2011 |
| WO | WO 2011/028254 | 3/2011 |
| WO | WO 2011/050291 | 4/2011 |
| WO | WO 2011/109688 | 9/2011 |
| WO | WO2012/145155 | 10/2012 |
| WO | WO 2012/145155 | 10/2012 |
| WO | 2014/205014 | 12/2014 |
| WO | WO2015/100419 | 7/2015 |

OTHER PUBLICATIONS

International Search Report and Written Opinion dated Jul. 23, 2012, from PCT/US2011/063534.
International Search Report and Written Opinion dated Jul. 22, 2013 from PCT/US2013/037115.
U.S. Notice of Allowance dated Mar. 11, 2010 for U.S. Appl. No. 12/212,482.
Tseng, C-Y et al., "Improved performance mechanism of III-V compound triple-junction solar cell using hybrid electrode structure," Solar Energy, vol. 89, Jan. 19, 2013, pp. 17-22.
International Preliminary Report on Patentability dated Oct. 30, 2014 from PCTUS2013/037115.
International Search Report and Written Opinion dated May 4, 2010 from PCT/US2009/56928.
International Preliminary Report on Patentability dated Mar. 22, 2011 from PCT/US2009/56928.
International Search Report and Written Opinion dated Oct. 21, 2014 from PCT/US2014/042819.
EP Search Report dated Jun. 25, 2015 for EP09815048.5.
International Preliminary Report on Patentability dated Dec. 30, 2015 from PCT/US2014/042819.
EP Search Report dated Oct. 27, 2015 for EP13778088.8.
U.S. Office Action dated Nov. 3, 2016 for U.S. Appl. No. 14/893,505.
Chinese Office Action dated Sep. 28, 2016 in CN Application No. 201380020654.4.
European Examination Report dated Nov. 16, 2016 for EP Application No. 13778088.8.
European Extended Search Report dated Nov. 2, 2016 for EP Application No. 14814624.4.
U.S. Final Office Action dated Aug. 29, 2017 for U.S. Appl. No. 14/893,505.
European Office Action dated Aug. 31, 2017 for EP Application No. 14814624.4.
Chinese Second Office Action dated Jul. 20, 2017 for CN Application No. 201380020654.4.
U.S. Office Action dated May 17, 2018 for U.S. Appl. No. 14/893,505.
U.S. Final Office Action dated Jan. 7, 2019 for U.S. Appl. No. 14/893,505.
European Office Action/Intention to Grant dated Apr. 19, 2018 for EP09815048.5.
Chinese Office Action dated Mar. 20, 2018 in CN Application No. 201380020654.4.
European Extended Search Report dated Jul. 24, 2018 for EP Application No. 17205976.8.
Chinese Office Action dated Jun. 4, 2018 in CN Application No. 201480035059.2.
European Office Action dated May 4, 2018 for EP Application No. 14814624.4.
European Office Action dated Nov. 12, 2018 for EP Application No. 14814624.4.
Russian Office Action dated Mar. 6, 2018 for RU Application No. 2016101089.
Russian Office Action dated Jul. 30, 2018 for RU Application No. 2016101089.
Taiwanese Office Action dated Dec. 27, 2017 for TW Application No. 103120947.
Taiwanese Office Action dated Aug. 3, 2018 for TW Application No. 103120947.
Taiwanese Office Action dated Jan. 23, 2019 for TW Application No. 103120947—No Translation.
U.S. Notice of Allowance dated Jun. 26, 2019 for U.S. Appl. No. 14/893,505.
European Office Action dated Jun. 28, 2019 for EP Application No. 14814624.4.
Taiwanese Office Action dated Jan. 23, 2019 for TW Application No. 103120947.

\* cited by examiner

ANGLED BUS BAR

FIELD

The disclosed embodiments relate generally to bus bars for optically switchable devices, and more particularly to angled bus bars for thin film optically switchable devices.

BACKGROUND

Various optically switchable devices are available for controlling tinting, reflectivity, etc., of window panes or lites. Electrochromic devices are one example of optically switchable devices. Electrochromism is a phenomenon in which a material exhibits a reversible electrochemically-mediated change in an optical property when placed in a different electronic state, typically by being subjected to a voltage change. The optical property being manipulated is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial, and other uses. The color, transmittance, absorbance, and/or reflectance of such windows may be changed by inducing a change in the electrochromic material; i.e., electrochromic windows are windows that can be darkened or lightened electronically. A small voltage applied to an electrochromic device of the window will cause it to darken; reversing the voltage causes it to lighten. This capability allows for control of the amount of light that passes through the window, and presents an enormous opportunity for electrochromic windows to be used not only for aesthetic purposes but also for significant energy-savings. With energy conservation being foremost in modern energy policy, it is expected that growth of the electrochromic window industry will be robust in the coming years.

SUMMARY

Angled bus bars for thin film optically switchable devices are disclosed herein. Angled bus bars may allow for the transition of a thin film optically switchable device symmetrically and quickly, without overdriving the thin film optically switchable device.

In one embodiment, an apparatus includes a substrate with an optically switchable device disposed on a surface of the substrate. The optically switchable device has a perimeter with at least one corner including a first side, a first vertex joining the first side and a second side, and the second side. A first bus bar is affixed to the optically switchable device proximate to the corner and configured to deliver current and/or voltage for driving switching of the optically switchable device. The first bus bar includes a first arm and a second arm having a configuration that substantially follows the shape of the first side, the first vertex, and the second side of the corner. A second bus bar is affixed to the optically switchable device and configured to deliver current and/or voltage for driving switching of the optically switchable device. The second bus bar may be angled or not. One embodiment is an electrochromic device including at least one angled bus bar as described herein.

In another embodiment, a method of changing an optical state of an optically switchable device includes applying current and/or voltage to at least one angled bus bar as described herein, which is in electrical communication with the optically switchable device. In one embodiment, the angled bus bar is as described above, and it is the first of two bus bars in electrical communication with the optically switchable device. The optically switchable device is disposed on a surface of a substrate and has a perimeter with at least one corner including a first side, a first vertex joining the first side and a second side, and the second side. The first bus bar is affixed to the optically switchable device proximate the corner. The first bus bar includes a first arm and a second arm having a configuration that substantially follows the shape of the first side, the first vertex, and the second side of the corner. A second bus bar, applied to an opposing electrode of the optically switchable device, may be angled or not. In response to current and/or voltage applied to the first and the second bus bars, an optical state of the optically switchable device changes in a substantially uniform manner.

In another embodiment, a method of fabricating an optically switchable device includes fabricating the optically switchable device on a surface of a substrate in a single integrated vacuum deposition system. The substrate is in a substantially vertical orientation in the integrated vacuum deposition system. The optically switchable device has a perimeter with at least one corner including a first side, a first vertex joining the first side and a second side, and the second side. A first bus bar is formed on the optically switchable device proximate to the corner. The first bus bar includes a first arm and a second arm having a configuration that substantially follows the shape of the first side, the first vertex, and the second side of the corner. The first bus bar is configured to deliver current and/or voltage for driving switching of the optically switchable device.

In some embodiments, the method further includes forming a second bus bar on the optically switchable device. The second bus bar is configured to deliver current and/or voltage for driving switching of the optically switchable device. In some embodiments, the perimeter of the optically switchable device has a second corner including a third side, a second vertex joining the third side and a fourth side, and the fourth side. The second bus bar includes a third arm and a fourth arm having a configuration that substantially follows the shape of the third side, the second vertex, and the fourth side of the second corner.

In another embodiment, an electrochromic lite includes a substantially transparent substrate with an electrochromic device thereon. The electrochromic device has an area bounded by four sides. The electrochromic lite further includes a first bus bar and a second bus bar. The first bus bar is in electrical communication with a bottom transparent conductor of the electrochromic device. The second bus bar is in electrical communication with a top transparent conductor of the electrochromic device. The first bus bar is diagonally opposed to the second bus bar. Each of the first and second bus bars spans diagonally opposing vertices of the area and at least some portion of the two sides forming each of the diagonally opposing vertices.

In some embodiments, the area of the electrochromic device is a substantially rectangular area. The at least some portion spanned by the first and the second bus bars is between about 10% and about 90%, between about 10% and about 65%, or between about 35% and about 65% of the length of the respective sides of the substantially rectangular area.

In some embodiments, the area of the electrochromic device is a substantially rectangular area. Each of the first and second bus bars is L-shaped. A first arm of each of the first and second bus bars traverses a portion of a longer side of the substantially rectangular area. A second arm of each of the first and second bus bars traverses a portion of a shorter side, substantially orthogonal to the longer side, of the substantially rectangular area. The first arm is longer than the second arm. In some embodiments, the first arm spans between about 75% and about 90% of the longer side, and the second arm spans between about 25% and about 75% of the shorter side. In some other embodiments, the substantially rectangular area is square and all the arms of the first and second bus bars are of substantially equal length.

In some embodiments, the first bus bar and the second bus bar are configured such that the optically switchable device switches from a first optical state to a second optical state in about 10 minutes or less. In some embodiments, the electrochromic device is all solid state and inorganic.

These and other features and advantages will be described in further detail below, with reference to the associated drawings.

DETAILED DESCRIPTION

Introduction and Overview of Electrochromic Devices: Fabrication

It should be understood that while the disclosed embodiments focus on electrochromic (EC) windows (also referred to as smart windows), the concepts disclosed herein may apply to other types of switchable optical devices, including liquid crystal devices, suspended particle devices, and the like. For example, a liquid crystal device or a suspended particle device, instead of an electrochromic device, could be incorporated in any of the disclosed embodiments.

In order to orient the reader to the embodiments of angled bus bars disclosed herein, a brief discussion of electrochromic devices is provided. This initial discussion of electrochromic devices is provided for context only, and the subsequently described embodiments of angled bus bars are not limited to the specific features and fabrication processes of this initial discussion.

Figure 1A:
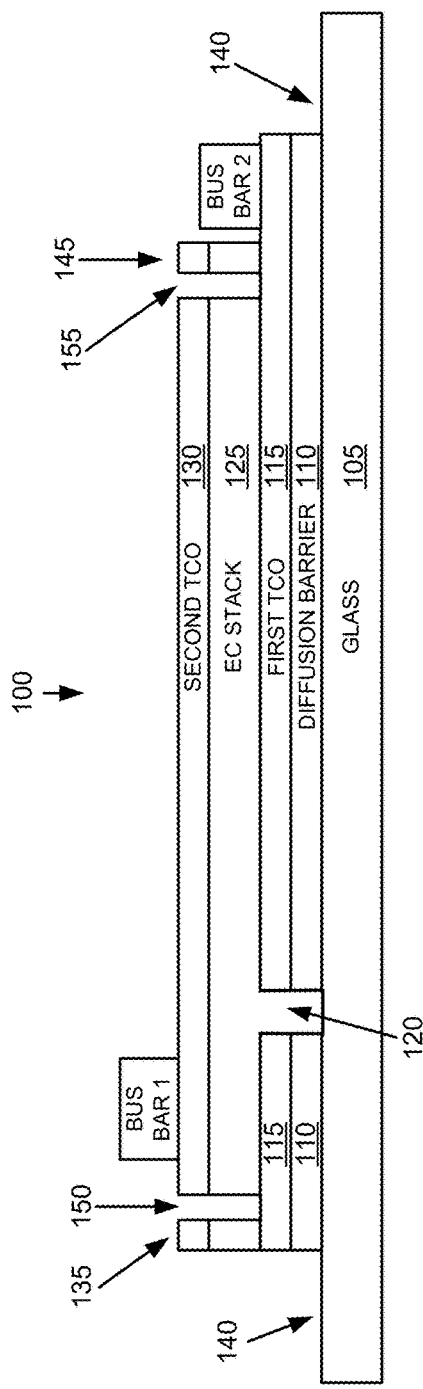
FIGS. 1A-1C show schematic diagrams of electrochromic devices formed on glass substrates, i.e. electrochromic lites.
Figure 1B:
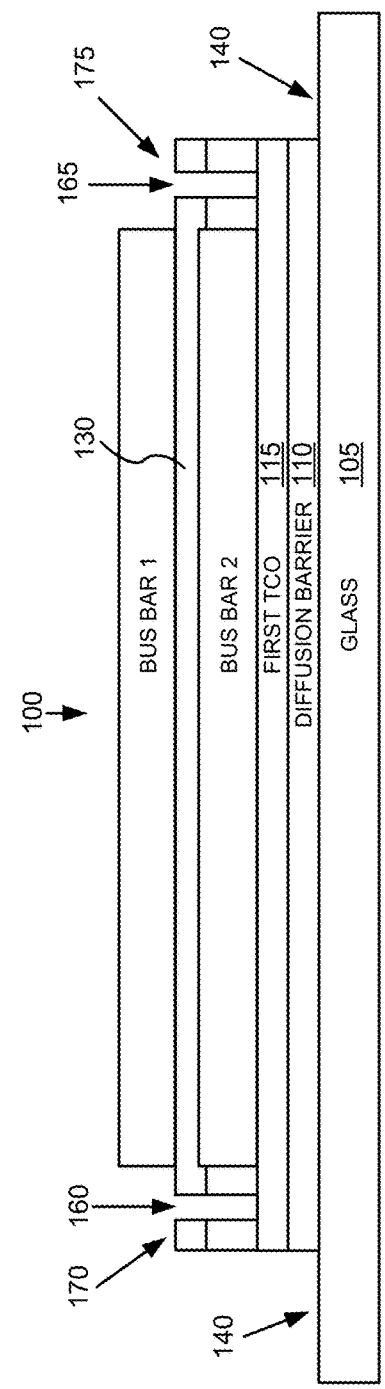
Figure 1C:
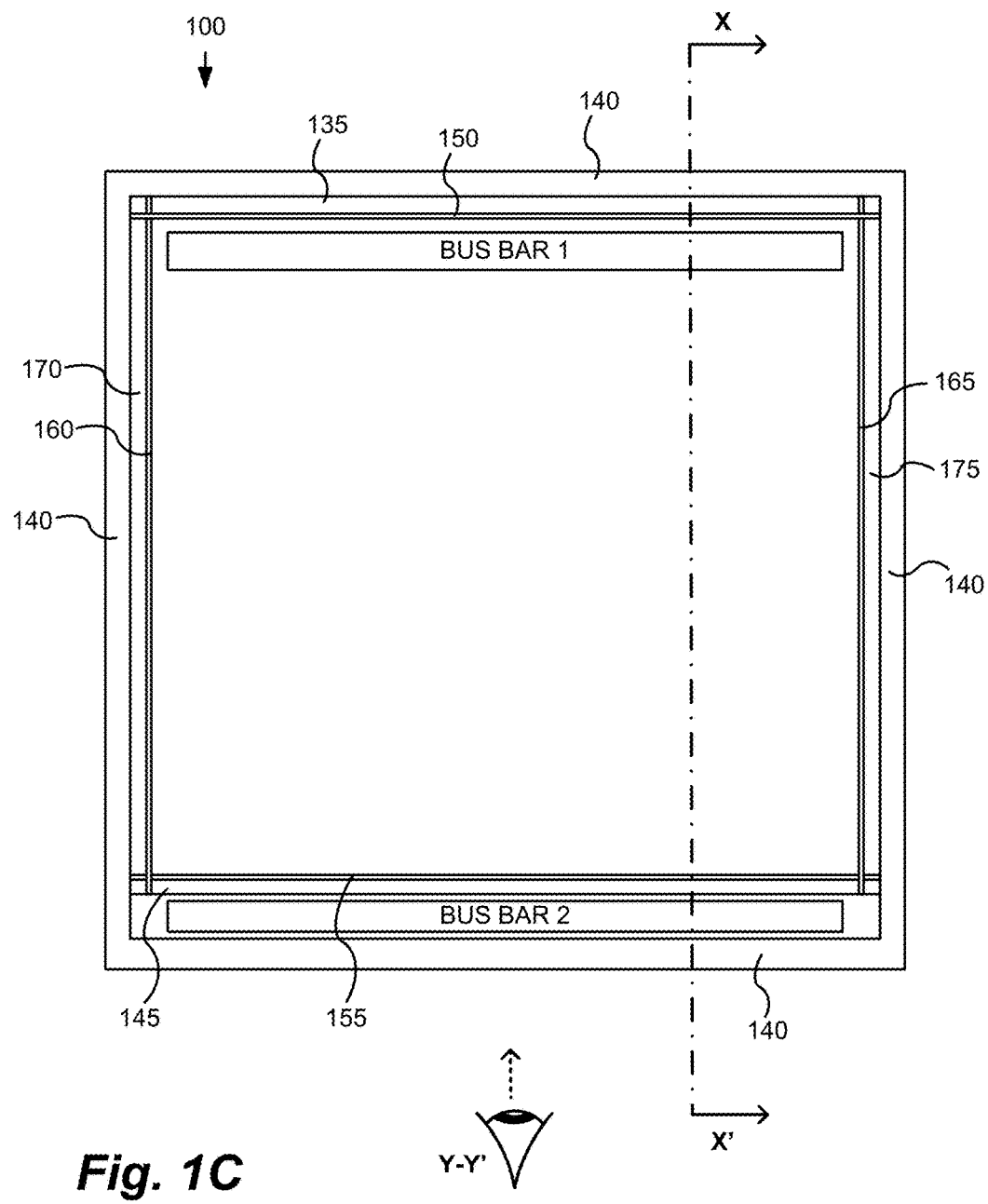

A particular example of an electrochromic lite is described with reference to FIGS. 1A-1C, in order to illustrate embodiments described herein. FIG. 1A is a cross-sectional representation (see cut X-X' of FIG. 1C) of an electrochromic lite, 100, which is fabricated starting with a glass sheet, 105. FIG. 1B shows an end view (see perspective Y-Y' of FIG. 1C) of EC lite 100, and FIG. 1C shows a top-down view of EC lite 100. FIG. 1A shows the electrochromic lite after fabrication on glass sheet 105, edge deleted to produce area, 140, around the perimeter of the lite. The electrochromic lite has also been laser scribed and bus bars have been attached. The glass lite 105 has a diffusion barrier, 110, and a first transparent conducting oxide (TCO), 115, on the diffusion barrier. In this example, the edge deletion process removes both TCO 115 and diffusion barrier 110, but in other embodiments only the TCO is removed, leaving the diffusion barrier intact. The TCO 115 is the first of two conductive layers used to form the electrodes of the electrochromic device fabricated on the glass sheet. In this example, the glass sheet includes underlying glass and the diffusion barrier layer. Thus, in this example, the diffusion barrier is formed, and then the first TCO, an EC stack, 125, (e.g., having electrochromic, ion conductor, and counter electrode layers), and a second TCO, 130, are formed. In one embodiment, the electrochromic device (EC stack and second TCO) is fabricated in an integrated deposition system where the glass sheet does not leave the integrated deposition system at any time during fabrication of the stack. In one embodiment, the first TCO layer is also formed using the integrated deposition system where the glass sheet does not leave the integrated deposition system during deposition of the EC stack and the (second) TCO layer. In one embodiment, all of the layers (diffusion barrier, first TCO, EC stack, and second TCO) are deposited in the integrated deposition system where the glass sheet does not leave the integrated deposition system during deposition. In this example, prior to deposition of EC stack 125, an isolation trench, 120, is cut through TCO 115 and diffusion barrier 110. Trench 120 is made in contemplation of electrically isolating an area of TCO 115 that will reside under bus bar 1 after fabrication is complete (see FIG. 1A). This is done to avoid charge buildup and coloration of the EC device under the bus bar, which can be undesirable.

After formation of the EC device, edge deletion processes and additional laser scribing are performed. FIG. 1A depicts areas 140 where the device has been removed, in this example, from a perimeter region surrounding laser scribe trenches, 150, 155, 160, and 165, which pass through second TCO 130 and the EC stack, but not the first TCO 115. Laser scribe trenches 150, 155, 160, and 165 are made to isolate portions of the EC device, 135, 145, 170, and 175, which were potentially damaged during edge deletion processes from the operable EC device. In one embodiment, laser scribe trenches 150, 160, and 165 pass through the first TCO to aid in isolation of the device (laser scribe trench 155 does not pass through the first TCO, otherwise it would cut off bus bar 2's electrical communication with the first TCO and thus the EC stack). The laser or lasers used for the laser scribe processes are typically, but not necessarily, pulse-type lasers, for example, diode-pumped solid state lasers. For example, the laser scribe processes can be performed using a suitable laser from IPG Photonics (of Oxford, Mass.), or from Ekspla (of Vilnius, Lithuania). Scribing can also be performed mechanically, for example, by a diamond tipped scribe. One of ordinary skill in the art would appreciate that the laser scribing processes can be performed at different depths and/or performed in a single process whereby the laser cutting depth is varied, or not, during a continuous path around the perimeter of the EC device. In one embodiment, the edge deletion is performed to the depth of the first TCO.

After laser scribing is complete, bus bars are attached. Non-penetrating bus bar (1) is applied to the second TCO. Non-penetrating bus bar (2) is applied to an area where the device was not deposited (e.g., from a mask protecting the first TCO from device deposition), in contact with the first TCO or, in this example, where an edge deletion process (e.g., laser ablation using an apparatus having a XY or XYZ galvanometer) was used to remove material down to the first TCO. In this example, both bus bar 1 and bus bar 2 are non-penetrating bus bars. A penetrating bus bar is one that is typically pressed into and through the EC stack to make contact with the TCO at the bottom of the stack. A non-penetrating bus bar is one that does not penetrate into the EC stack layers, but rather makes electrical and physical contact on the surface of a conductive layer, for example, a TCO.

The TCO layers can be electrically connected using a non-traditional bus bar, for example, a bus bar fabricated with screen and lithography patterning methods. In one embodiment, electrical communication is established with the device's transparent conducting layers via silk screening (or using another patterning method) a conductive ink followed by heat curing or sintering the ink. Advantages to using the above described device configuration include simpler manufacturing, for example, and less laser scribing than conventional techniques which use penetrating bus bars.

After the bus bars are connected, the device is integrated into an insulated glass unit (IGU), which includes, for example, wiring the bus bars and the like. In some embodiments, one or both of the bus bars are inside the finished IGU, however in one embodiment one bus bar is outside the seal of the IGU and one bus bar is inside the IGU. In the former embodiment, area 140 is used to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer.

Figure 2A:
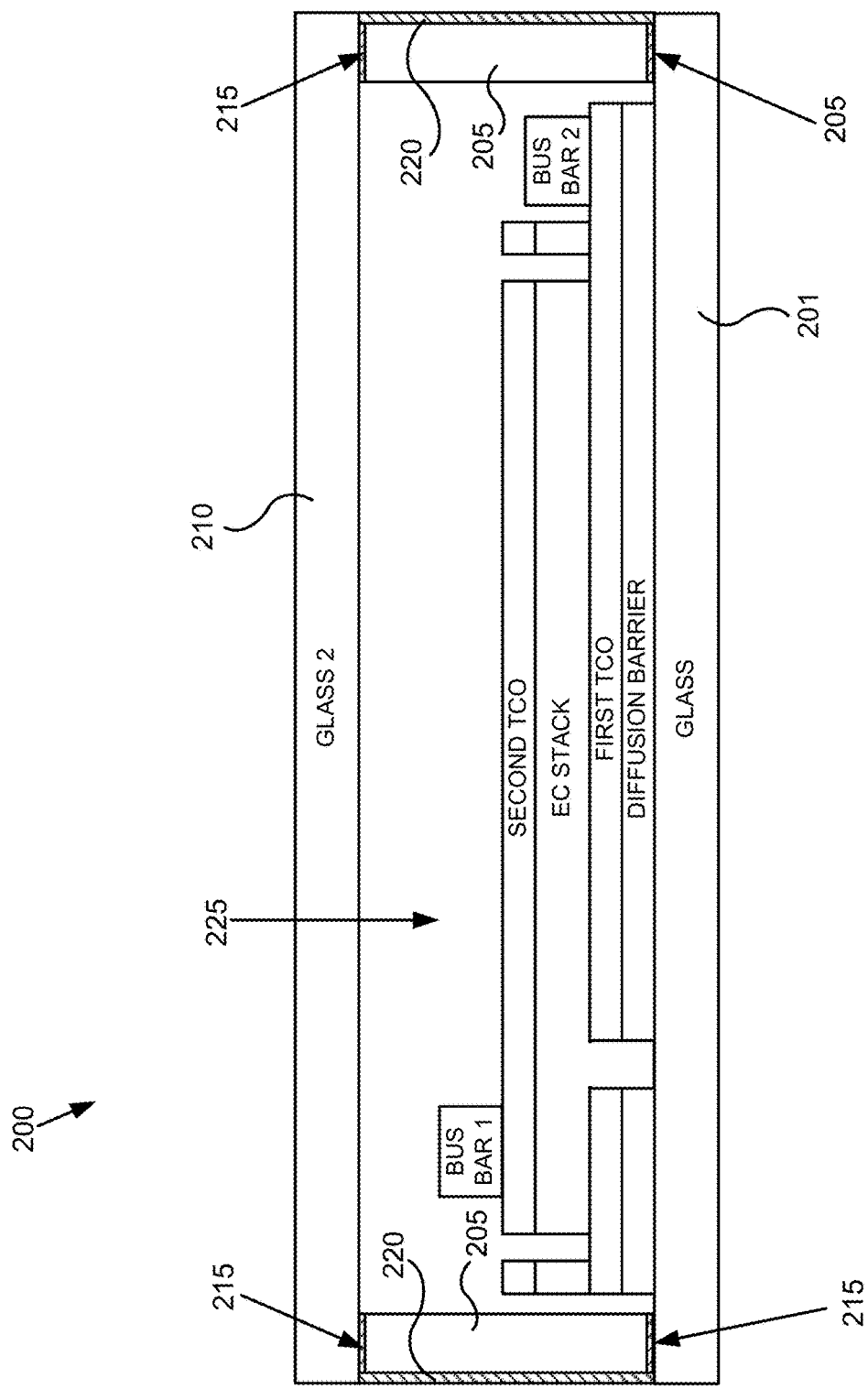
FIGS. 2A and 2B show cross-sectional schematic diagrams of the electrochromic lites as described in relation to FIGS. 1A-C integrated into an IGU.
Figure 2B:
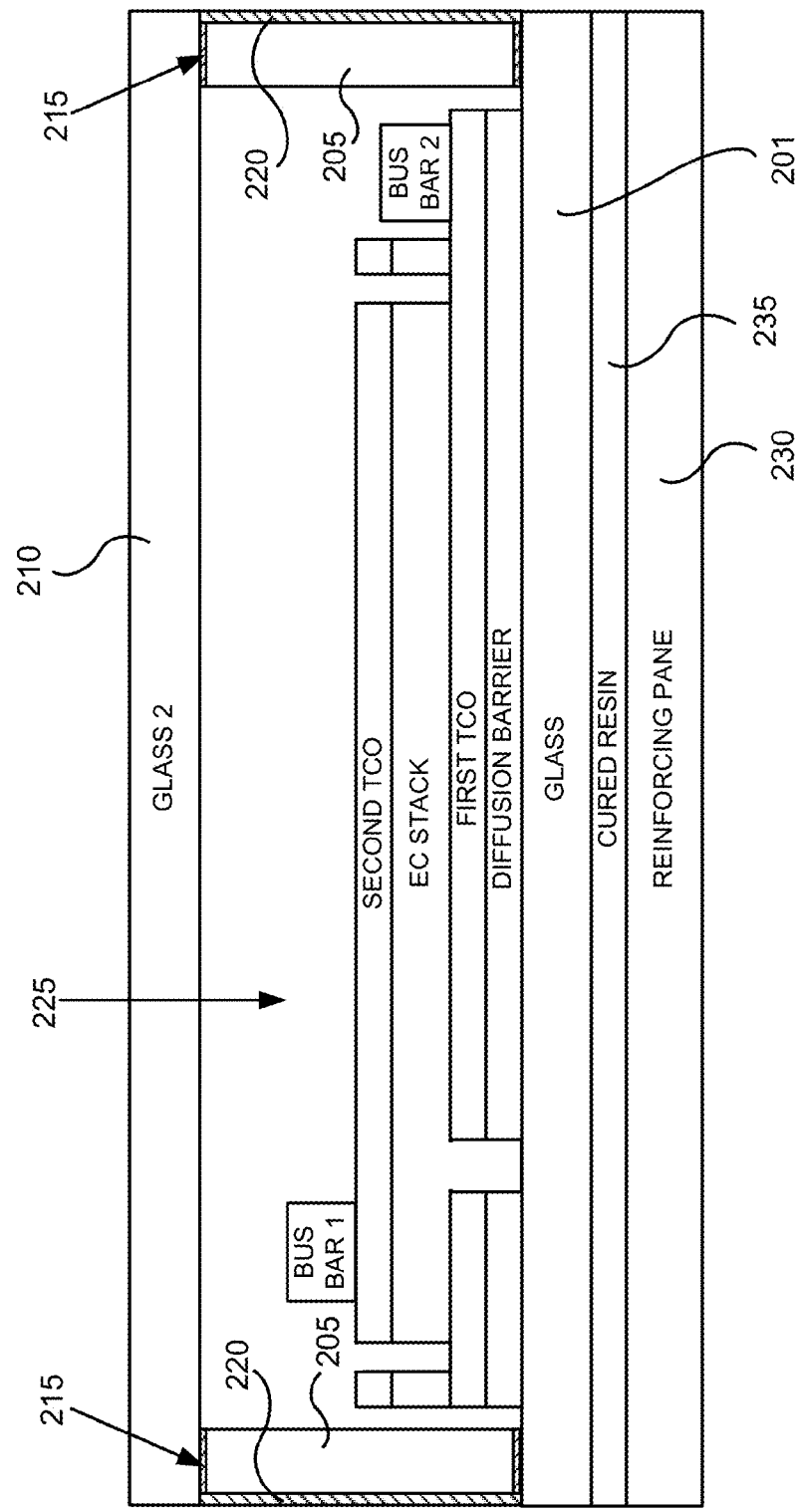

As described above, after the bus bars are connected, the electrochromic lite is integrated into an IGU, which includes, for example, wiring for the bus bars and the like. In the embodiments described herein, both of the bus bars are inside the primary seal of the finished IGU. FIG. 2A shows a cross-sectional schematic diagram of the electrochromic window as described in relation to FIGS. 1A-C integrated into an IGU, 200. A spacer, 205, is used to separate the electrochromic lite from a second lite, 210. Second lite 210 in IGU 200 is a non-electrochromic lite, however, the embodiments disclosed herein are not so limited. For example, lite 210 can have an electrochromic device thereon and/or one or more coatings such as low-E coatings and the like. Lite 201 can also be laminated glass, such as depicted in FIG. 2B (lite 201 is laminated to reinforcing pane, 230, via resin, 235). Between spacer 205 and the first TCO layer of the electrochromic lite is a primary seal material, 215. This primary seal material is also between spacer 205 and second glass lite 210. Around the perimeter of spacer 205 is a secondary seal, 220. Bus bar wiring/leads traverse the seals for connection to a controller. Secondary seal 220 may be much thicker that depicted. These seals aid in keeping moisture out of an interior space, 225, of the IGU. They also serve to prevent argon or other gas in the interior of the IGU from escaping.

Introduction and Overview of Electrochromic Devices: Function

Figure 3A:
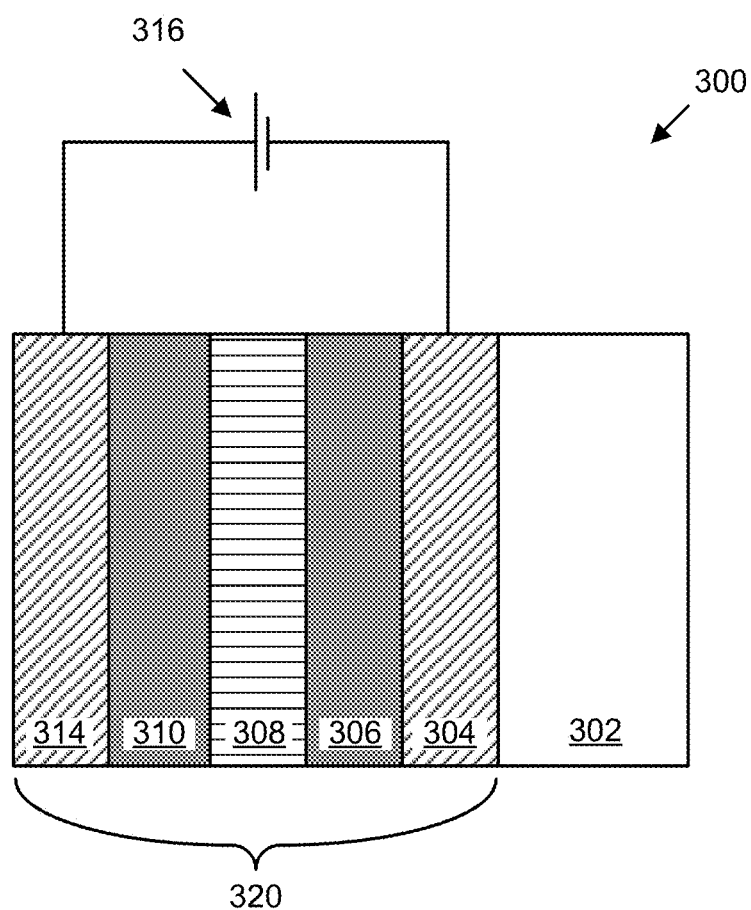
FIG. 3A is a schematic cross-section of an electrochromic device.

FIG. 3A schematically depicts an electrochromic device, 300, in cross-section. Electrochromic device 300 includes a substrate, 302, a first conductive layer (CL), 304, an electrochromic layer (EC), 306, an ion conducting layer (IC), 308, a counter electrode layer (CE), 310, and a second conductive layer (CL), 314. Layers 304, 306, 308, 310, and 314 are collectively referred to as an electrochromic stack 320. A voltage source 316 operable to apply an electric potential across electrochromic stack 320 effects the transition of the electrochromic device from, for example, a bleached state to a colored state (depicted). The order of layers can be reversed with respect to the substrate.

Electrochromic devices having distinct layers as described can be fabricated as all solid state and/or all inorganic devices with low defectivity. Such devices and methods of fabricating them are described in more detail in U.S. patent application Ser. No. 12/645,111, entitled, "Fabrication of Low-Defectivity Electrochromic Devices," filed on Dec. 22, 2009 and naming Mark Kozlowski et al. as inventors, and in U.S. patent application Ser. No. 12/645,159, entitled, "Electrochromic Devices," filed on Dec. 22, 2009 and naming Zhongchun Wang et al. as inventors, both of which are incorporated by reference herein for all purposes. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

Additionally, it should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 320 such that available ions in the stack reside primarily in the counter electrode 310. When the potential on the electrochromic stack is reversed, the ions are transported across the ion conducting layer 308 to the electrochromic material 306 and cause the material to transition to the colored state.

Referring again to FIG. 3A, voltage source 316 may be configured to operate in conjunction with radiant and other environmental sensors. As described herein, voltage source 316 interfaces with a device controller (not shown in this figure). Additionally, voltage source 316 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 302. Such substrates include, for example, glass, plastic, and mirror materials. Suitable glasses include either clear or tinted soda lime glass, including soda lime float glass. The glass may be tempered or untempered.

In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, for example, as large as about 80 inches by 120 inches. Architectural glass is typically at least about 2 mm thick, typically between about 3 mm and about 6 mm thick. Of course, electrochromic devices are scalable to substrates smaller or larger than architectural glass. Further, the electrochromic device may be provided on a mirror of any size and shape.

On top of substrate 302 is conductive layer 304. In certain embodiments, one or both of the conductive layers 304 and 314 is inorganic and/or solid. Conductive layers 304 and 314 may be made from a number of different materials, including conductive oxides, thin metallic coatings, conductive metal nitrides, and composite conductors. Typically, conductive layers 304 and 314 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used.

The function of the conductive layers is to spread an electric potential provided by voltage source 316 over surfaces of the electrochromic stack 320 to interior regions of the stack, with relatively little ohmic potential drop. The electric potential is transferred to the conductive layers though electrical connections to the conductive layers. In some embodiments, bus bars, one in contact with conductive layer 304 and one in contact with conductive layer 314, provide the electric connection between the voltage source 316 and the conductive layers 304 and 314. The conductive layers 304 and 314 may also be connected to the voltage source 316 with other conventional means.

Overlaying conductive layer 304 is electrochromic layer 306. In some embodiments, electrochromic layer 306 is inorganic and/or solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, electrochromic layer 306 transfers ions to and receives ions from counter electrode layer 310 to cause optical transitions.

Generally, the colorization (or change in any optical property—e.g., absorbance, reflectance, and transmittance) of the electrochromic material is caused by reversible ion insertion into the material (e.g., intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions ($Li^+$) and hydrogen ions ($H^+$) (that is, protons). In some cases, however, other ions will be suitable. In various embodiments, lithium ions are used to produce the electrochromic phenomena. Intercalation of lithium ions into tungsten oxide ($WO_{3-y}$ ($0<y\leq\sim0.3$)) causes the tungsten oxide to change from transparent (bleached state) to blue (colored state).

Referring again to FIG. 3A, in electrochromic stack 320, ion conducting layer 308 is sandwiched between electrochromic layer 306 and counter electrode layer 310. In some embodiments, counter electrode layer 310 is inorganic and/or solid. The counter electrode layer may comprise one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue.

When charge is removed from a counter electrode 310 made of nickel tungsten oxide (that is, ions are transported from counter electrode 310 to electrochromic layer 306), the counter electrode layer will transition from a transparent state to a colored state.

In the depicted electrochromic device, between electrochromic layer 306 and counter electrode layer 310, there is the ion conducting layer 308. Ion conducting layer 308 serves as a medium through which ions are transported (in the manner of an electrolyte) when the electrochromic device transitions between the bleached state and the colored state. Preferably, ion conducting layer 308 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 308 is inorganic and/or solid.

Examples of suitable ion conducting layers (for electrochromic devices having a distinct IC layer) include silicates, silicon oxides, tungsten oxides, tantalum oxides, niobium oxides, and borates. These materials may be doped with different dopants, including lithium. Lithium doped silicon oxides include lithium silicon-aluminum-oxide. In some embodiments, the ion conducting layer comprises a silicate-based structure. In some embodiments, a silicon-aluminum-oxide (SiAlO) is used for the ion conducting layer 308.

Electrochromic device 300 may include one or more additional layers (not shown), such as one or more passive layers. Passive layers used to improve certain optical properties may be included in electrochromic device 300. Passive layers for providing moisture or scratch resistance may also be included in electrochromic device 300. For example, the conductive layers may be treated with anti-reflective or protective oxide or nitride layers. Other passive layers may serve to hermetically seal electrochromic device 300.

Figure 3B:
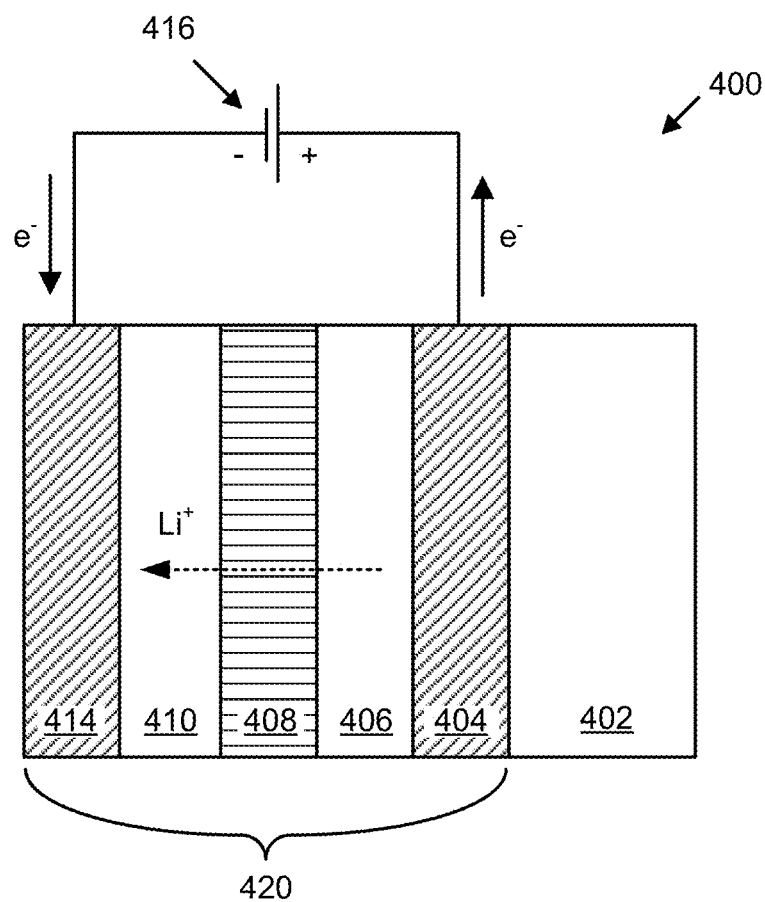
FIG. 3B is a schematic cross-section of an electrochromic device in a bleached state (or transitioning to a bleached state).

FIG. 3B is a schematic cross-section of an electrochromic device in a bleached state (or transitioning to a bleached state). In accordance with specific embodiments, an electrochromic device, 400, includes a tungsten oxide electrochromic layer (EC), 406, and a nickel-tungsten oxide counter electrode layer (CE), 410. Electrochromic device 400 also includes a substrate, 402, a conductive layer (CL), 404, an ion conducting layer (IC), 408, and conductive layer (CL), 414.

A power source, 416, is configured to apply a potential and/or current to an electrochromic stack, 420, through suitable connections (e.g., bus bars) to the conductive layers, 404 and 414. In some embodiments, the voltage source is configured to apply a potential of about 2 volts in order to drive a transition of the device from one optical state to another. The polarity of the potential as shown in FIG. 3A is such that the ions (lithium ions in this example) primarily reside (as indicated by the dashed arrow) in nickel-tungsten oxide counter electrode layer 410.

Figure 3C:
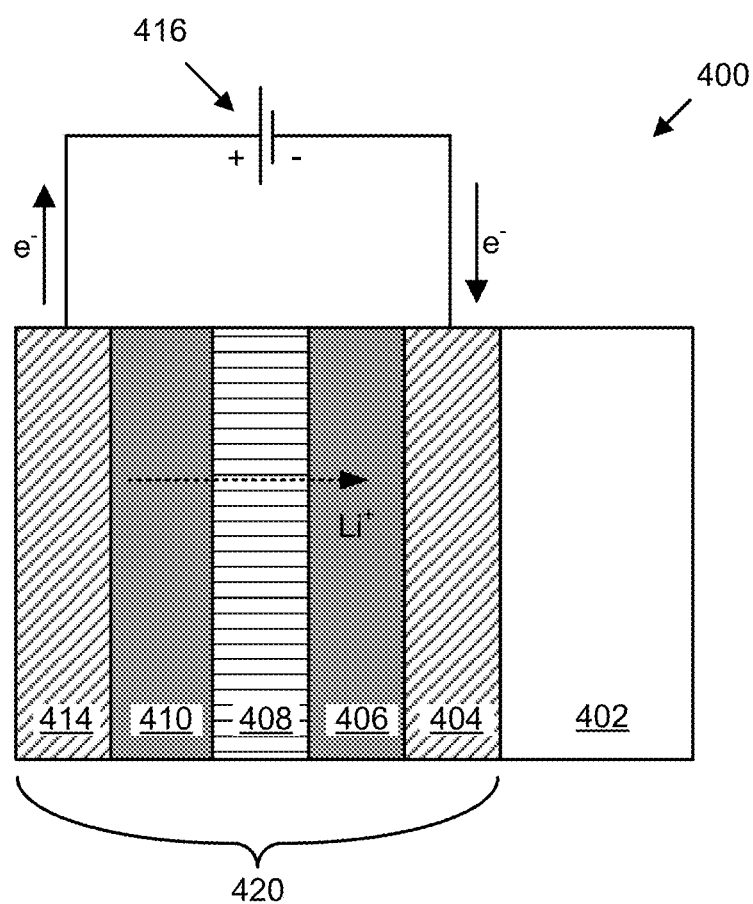
FIG. 3C is a schematic cross-section of the electrochromic device shown in FIG. 3B, but in a colored state (or transitioning to a colored state).

FIG. 3C is a schematic cross-section of electrochromic device 400 shown in FIG. 3B but in a colored state (or transitioning to a colored state). In FIG. 3C, the polarity of voltage source 416 is reversed, so that the electrochromic layer is made more negative to accept additional lithium ions, and thereby transition to the colored state. As indicated by the dashed arrow, lithium ions are transported across ion conducting layer 408 to tungsten oxide electrochromic layer 406. Tungsten oxide electrochromic layer 406 is shown in the colored state. Nickel-tungsten oxide counter electrode 410 is also shown in the colored state. As explained, nickel-tungsten oxide becomes progressively more opaque as it gives up (deintercalates) lithium ions. In this example, there is a synergistic effect where the transition to colored states for both layers 406 and 410 are additive toward reducing the amount of light transmitted through the stack and substrate.

As described above, an electrochromic device may include an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed with angled bus bars described herein. Such devices, and methods of fabricating them, are described in U.S. patent application Ser. Nos. 12/772,055 and 12/772,075, each filed on Apr. 30, 2010, and in U.S. patent application Ser. Nos. 12/814,277 and 12/814,279, each filed on Jun. 11, 2010—each of the four applications is entitled "Electrochromic Devices," each names Zhongchun Wang et al. as inventors, and each is incorporated by reference herein in its entirety.

Figure 4:
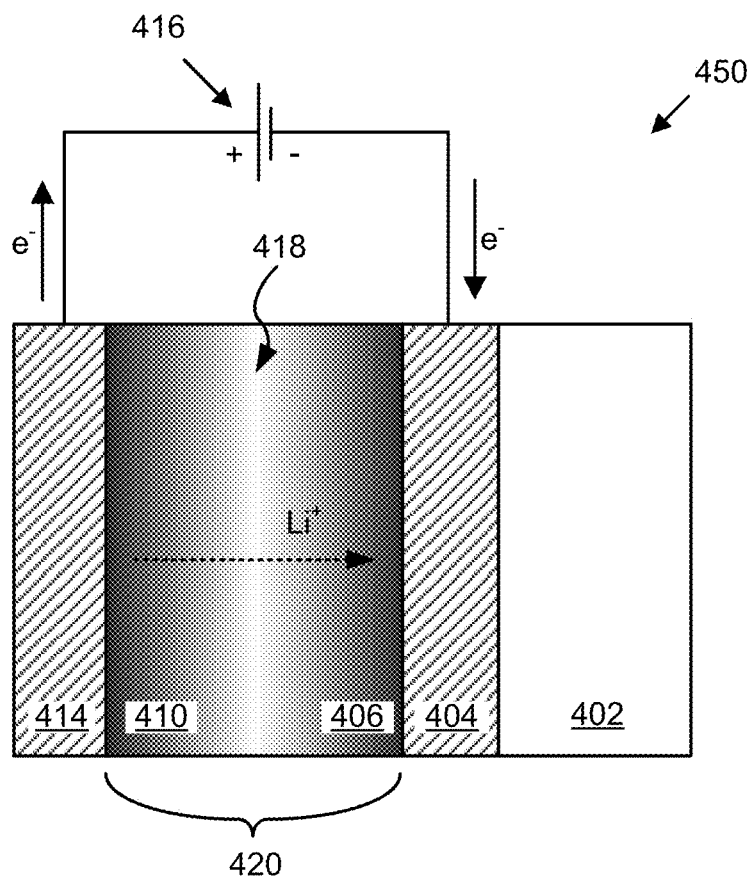
FIG. 4 is a schematic cross-section of an electrochromic device in a colored state, where the device has an interfacial region which does not contain a distinct ion conductor layer.

FIG. 4 is a schematic cross-section of an electrochromic device, 450, in a colored state, where the device has an interfacial region, 418, which does not contain a distinct IC layer. Voltage source 416, conductive layers 414 and 404, and substrate 402 are essentially the same as described in relation to FIGS. 3A-3C. Between conductive layers 414 and 404 is a region 420, which includes counter electrode layer 410, electrochromic layer 406, and interfacial region 418 between them, rather than a distinct IC layer. In this example, there is no distinct boundary between counter electrode layer 410 and interfacial region 418, nor is there a distinct boundary between electrochromic layer 406 and interfacial region 418. Rather, there is a diffuse transition between CE layer 410 and interfacial region 418, and between interfacial region 418 and EC layer 406.

Transition of an Electrochromic Device

As noted above, a switchable optical device such as an electrochromic device reversibly cycles between two or more optical states such as a bleached state and a colored state. Switching between these states is controlled by applying predefined current and/or voltage to the device. Higher currents and/or voltages are generally applied to larger switchable optical devices compared to smaller switchable optical devices to cycle between optical states.

The speed of coloration of an electrochromic device is a function of the applied current and/or voltage. Generally, the higher the current and/or voltage applied across the electrochromic device, the faster the electrochromic device will transition between optical states. Applying a high current and/or voltage across the electrochromic device, however, depending on the configuration of the bus bars of the electrochromic device, may result in damage to regions of the electrochromic device due to the regions being exposed to too high a current and/or voltage. These regions are sometimes referred to as "hot spots." On the other hand, if a low current and/or voltage is applied across the electrochromic device, the device may not completely switch between optical states or may switch at an undesirably slow rate between optical states.

Further, large electrochromic devices such as those on residential windows or architectural glass may exhibit an effect sometimes referred to as the "terminal effect." This is due to the relatively high sheet resistance of thin electrochromic device films, including the electrodes, coupled with device designs having terminals (bus bars) located outside the viewable area of the substrate, for example, only at the edges of the device/substrate. In such devices, there is a considerable ohmic potential drop over the area of the device (and concomitant leakage current), from the terminal located at the edge of the device to the center of the device, where there is no contact to an external voltage source. As a result, not only does the center region of the device transition more slowly than the edge regions proximate terminal contacts (which is referred to as the "curtain effect"), but the center region may never fully transition. In other words, the center may transition only to a limited extent in comparison to the edges. Further, to the extent that the center of the device transitions, it does so more slowly than the edge of the device. Yet further, it may be difficult to hold a transition state, once such state is reached in the center of the device. These edge-to-center non-uniformities can be perceptible to and distracting to users.

Bus Bar Configurations

Different bus bar configurations may be used, e.g., with a large electrochromic device, to substantially minimize hot spots or exposing the electrochromic device to a damaging current and/or voltage and to substantially minimize the curtain effect. Additionally, different bus bar configurations may be used to substantially maximize the transition rate between optical states of the electrochromic device.

Figure 5A:
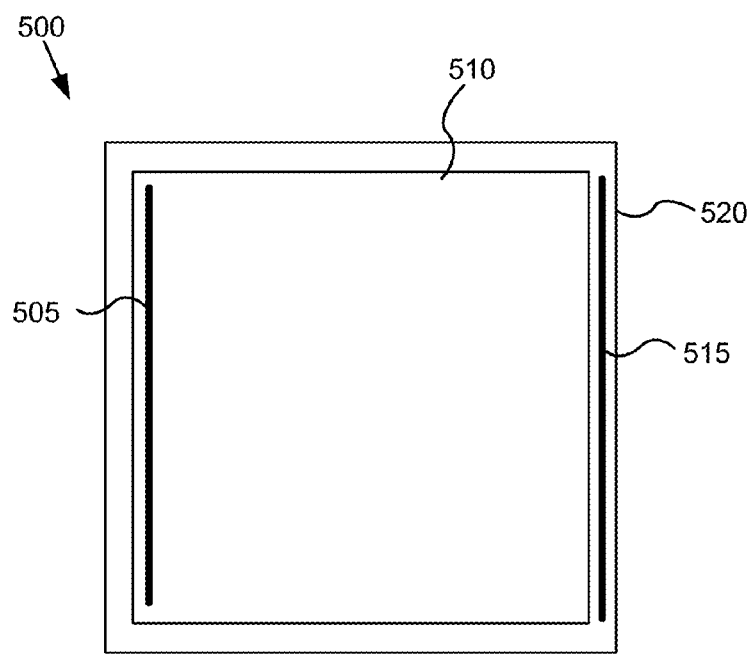
FIG. 5A shows a schematic diagram of an electrochromic lite with planar bus bars.

FIG. 5A shows a top-down view of an electrochromic lite, 500, including bus bars having a planar configuration. In some embodiments, electrochromic lite 500 may be similar to electrochromic lite 100 shown in FIGS. 1A-1C. Electrochromic lite 500 includes a first bus bar, 505, disposed on a first conductive layer, 510, and a second bus bar, 515, disposed on a second conductive layer, 520. An electrochromic stack (not shown) is between first conductive layer 510 and second conductive layer 520. As shown, first bus bar 505 may extend substantially across one side of first conductive layer 510. Second bus bar 515 may extend substantially across one side of second conductive layer 520 opposite the side of electrochromic lite 500 on which first bus bar 505 is disposed.

Figure 5B:
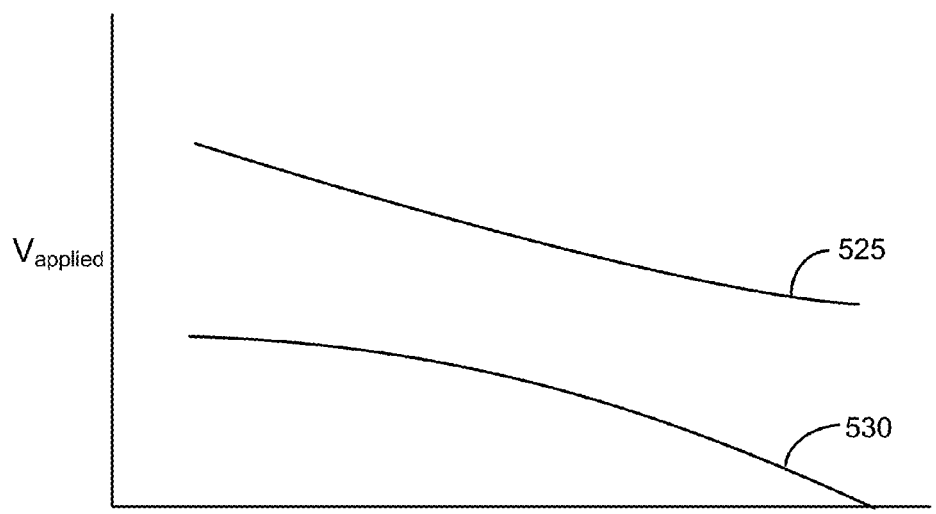
FIGS. 5B-5D show diagrams associated with the operation of the electrochromic lite shown in FIG. 5A.

As noted above, the configuration of first and second bus bars 505 and 515 in FIG. 5A may be referred to as a planar bus bar configuration. FIG. 5B is a graph showing a plot of the voltage applied to first bus bar 505 and the voltage applied to second bus bar 515 that may be used to transition electrochromic lite 500 from a bleached state to a colored state, for example. Plot 525 shows the voltage applied to first bus bar 505 and through first conductive layer 510. As shown, the voltage drops from the left hand side (e.g., where first bus bar 505 is disposed on first conductive layer 510 and where the voltage is applied) to the right hand side of first conductive layer 510 due to the sheet resistance of first conductive layer 510. Plot 530 shows the voltage applied to second bus bar 515 and through second conductive layer 520. As shown, the voltage increases from the right hand side (e.g., where second bus bar 515 is disposed on second conductive layer 520 and where the voltage is applied) to the left hand side of second conductive layer 520 due to the sheet resistance of second conductive layer 520.

Figure 5C:
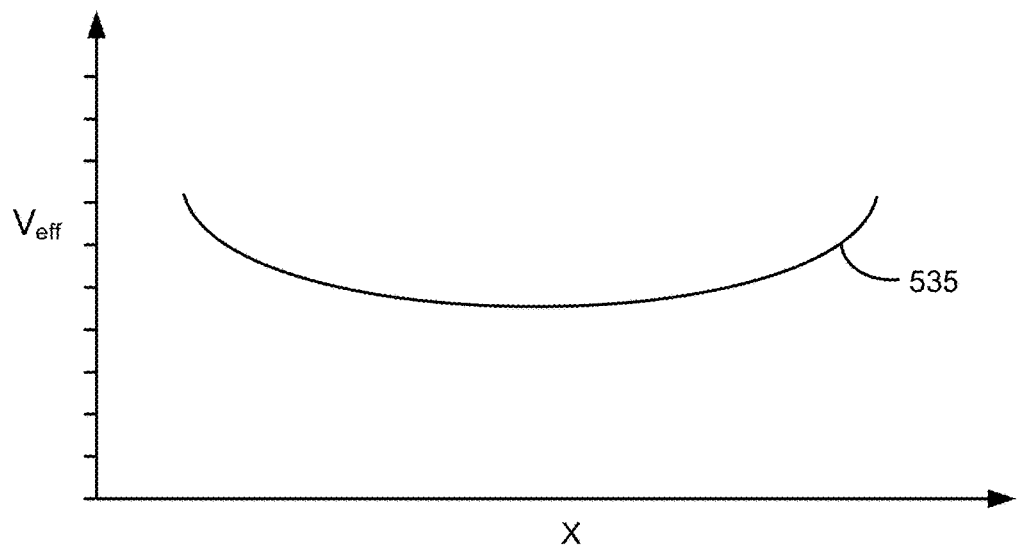

FIG. 5C is a graph showing a plot of the effective voltage applied across the electrochromic device between first and second conductive layers 510 and 520 of electrochromic lite 500. The effective voltage is the voltage difference between the voltage applied to first bus bar 505 and through first conductive layer 510 and the voltage applied to second bus bar 515 and through second conductive layer 520. Regions of an electrochromic device subjected to higher effective voltages transition between optical states faster than regions subjected to lower effective voltages. As shown, the effective voltage is the lowest at the center of electrochromic lite 500 and highest at the edges of electrochromic lite 500.

Figure 5D:
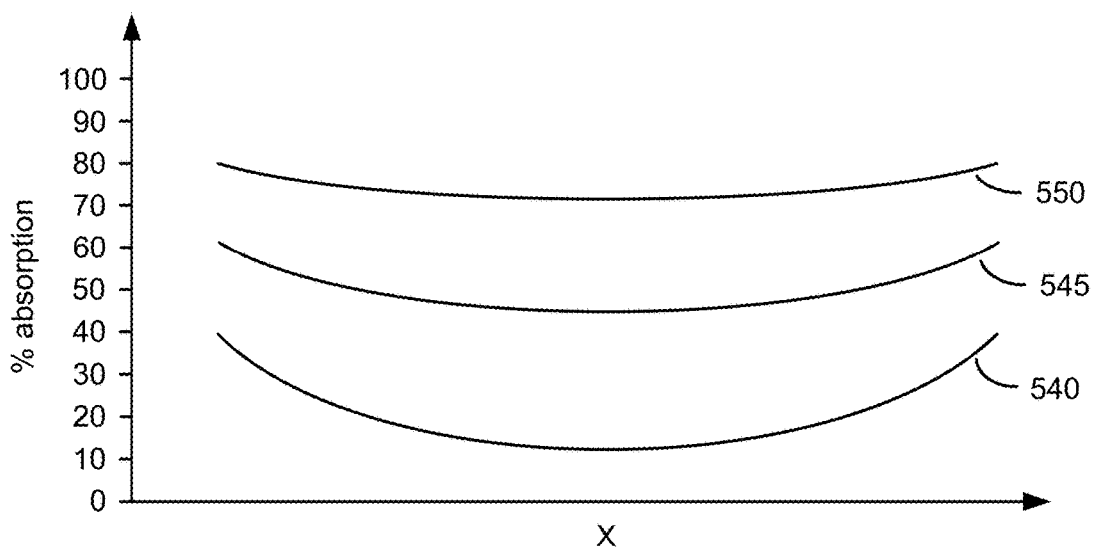

FIG. 5D is a graph showing plots of the percent absorption of visible light through electrochromic lite 500 when it is transitioning from a bleached state to a colored state due to the application of the voltages applied to first and second bus bars 505 and 515 in FIG. 5B. Plot 540 is the percent absorption across electrochromic lite 500 a short time after application of the voltages. In plot 540 the edges of electrochromic lite 500 have transitioned faster than the center of electrochromic lite 500. This is the curtain effect; coloration of electrochromic lite 500 starts along the edges of electrochromic lite 500 where first and second bus bars 505 and 515 are disposed. Plot 545 shows the percent absorption across electrochromic lite 500, midway through the transition from a bleached state to a colored state. In plot 545, electrochromic lite 500 is more colored (i.e., higher percent absorption of light), but there is still a drop in the absorption of light at the center of electrochromic lite 500. Plot 550 is the percent absorption across electrochromic lite 500 when the lite is in a fully colored state. As shown, the percent absorption of light may not be uniform across electrochromic lite 500 in the fully colored state due to the effective voltage drop across electrochromic lite 500 (see FIG. 5C), but this may not be perceptible to the human eye.

An advantage of planar bus bar configurations includes little risk of overdriving an electrochromic device. However, planar bus bar configurations may exhibit a longer duration curtain effect and take longer to transition an electrochromic device between optical states than other bus bar configurations.

Figure 6A:
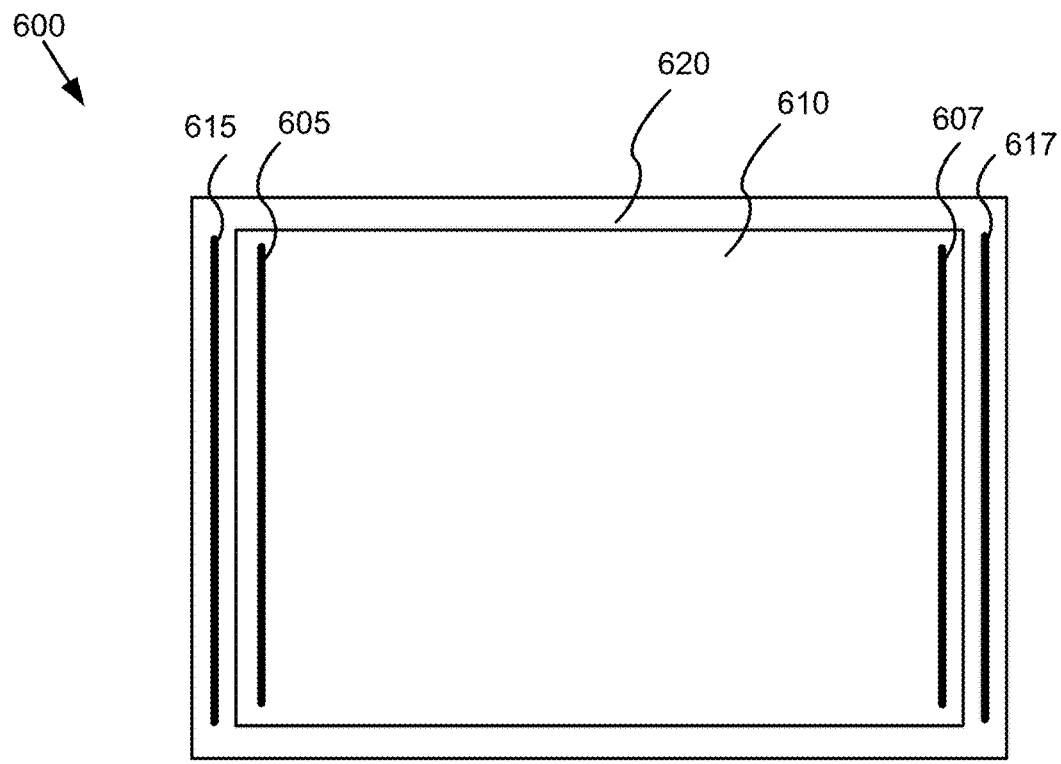
FIG. 6A shows a schematic diagram of an electrochromic lite with cylindrical bus bars.

FIG. 6A shows a top-down view of an electrochromic lite, 600, including bus bars having a cylindrical configuration. Electrochromic lite 600 includes first bus bars, 605 and 607, disposed on a first conductive layer, 610, and second bus bars, 615 and 617, disposed on a second conductive layer, 620. An electrochromic stack (not shown) is between first conductive layer 610 and second conductive layer 620. First bus bars 605 and 607 extend substantially across two opposing sides of first conductive layer 610. Second bus bars 615 and 617 extend substantially across two opposing sides of second conductive layer 620. As shown, first bus bars 605 and 607 and second bus bars 615 and 617 may be at locations such that first bus bar 605 and second bus bar 615 are close to one another and first bus bar 607 and second bus bar 617 are close to one another.

Figure 6B:
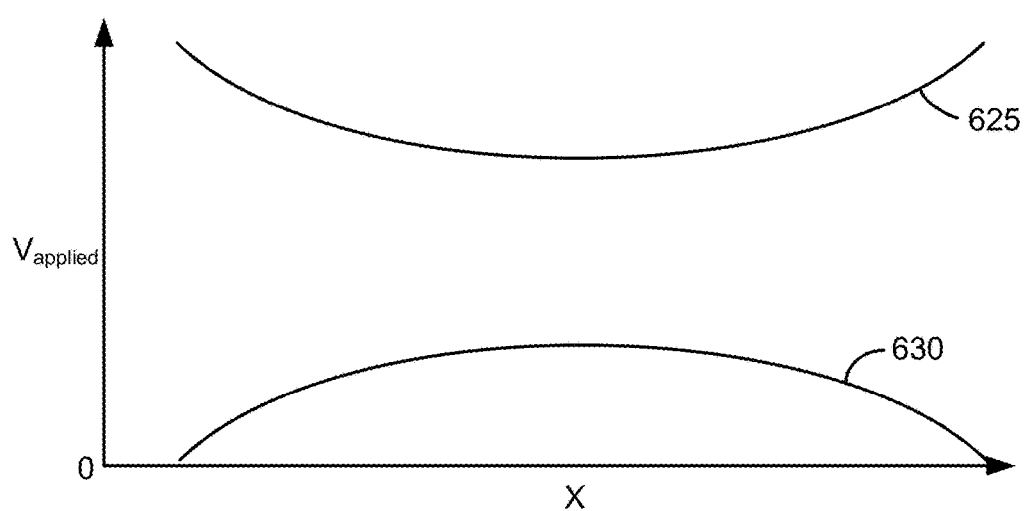
FIGS. 6B-6D show diagrams associated with the operation of the electrochromic lite shown in FIG. 6A.

As noted above, the configuration of first bus bars 605 and 607 and second bus bars 615 and 617 may be referred to as a cylindrical bus bar configuration. FIG. 6B is a graph showing a plot of the voltage applied to first bus bars 605 and 607 and the voltage applied to second bus bars 615 and 617 that may be used to transition electrochromic lite 600 from a bleached state to a colored state, for example. The same voltage may be applied to both of the first bus bars 605 and 607 (i.e., first bus bars 605 and 607 may be connected in parallel). The same voltage may be applied to both of the second bus bars 615 and 617 (i.e., second bus bars 615 and 617 may be connected in parallel). Plot 625 shows the voltage applied to first bus bars 605 and 607 and through first conductive layer 610. As shown, the voltage drops from the left hand side (e.g., where first bus bar 605 is disposed on first conductive layer 610 and where the voltage is applied) to the center of first conductive layer 610 due to the sheet resistance of first conductive layer 610. The voltage increases from the center of first conductive layer 610 to the right hand side (e.g., where first bus bar 607 is disposed on first conductive layer 610 and where the voltage is applied).

Plot 630 shows the voltage applied to second bus bars 615 and 617 and through second conductive layer 620. As shown, the voltage increases from the left hand side (e.g., where second bus bar 615 is disposed on second conductive layer 620 and where the voltage is applied) to the center of second conductive layer 620 due to the sheet resistance of second conductive layer 620. The voltage decreases from the center of second conductive layer 620 to the right hand side (e.g., where second bus bar 617 is disposed on second conductive layer 620 and where the voltage is applied).

Figure 6C:
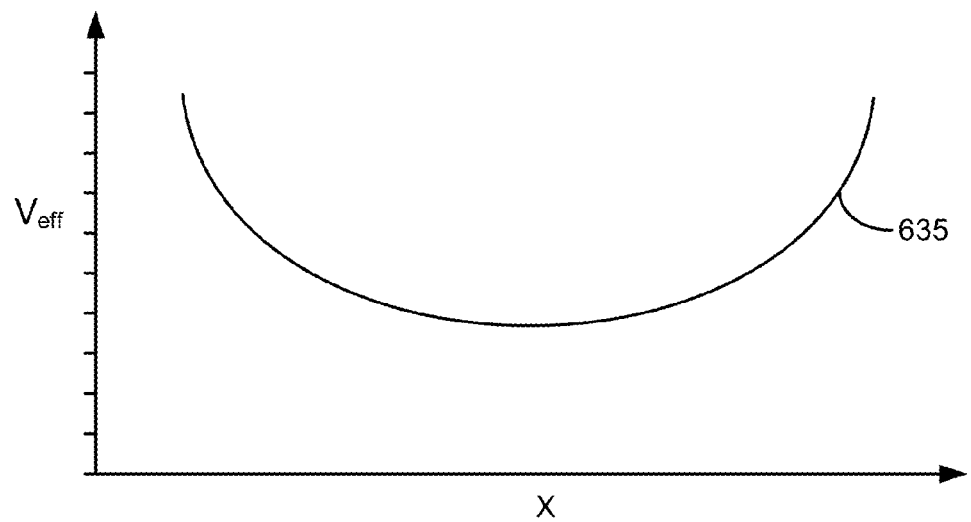

FIG. 6C is a graph showing a plot of the effective voltage applied across the electrochromic device between first and second conductive layers 610 and 620 of electrochromic lite 600. As shown, the effective voltage is the lowest at the center of electrochromic lite 600 and highest at the edges of electrochromic lite 600; the effective voltage at the edges of electrochromic lite 600 with the cylindrical bus bars is higher than the effective voltage at the edges of electrochromic lite 500 due to bus bars 605 and 615 and bus bars 607 and 617 being close to one another. While the edges of electrochromic lite 600 may transition between optical states rapidly due to this high effective voltage, the high effective voltage may overdrive the electrochromic device at the edges. Overdriving the device may mean that the device is damaged due to the inability of the device's structure to handle excess voltage, current, and/or ion flow. For example, the device may delaminate and/or cease to function in areas where overdriven.

Figure 6D:
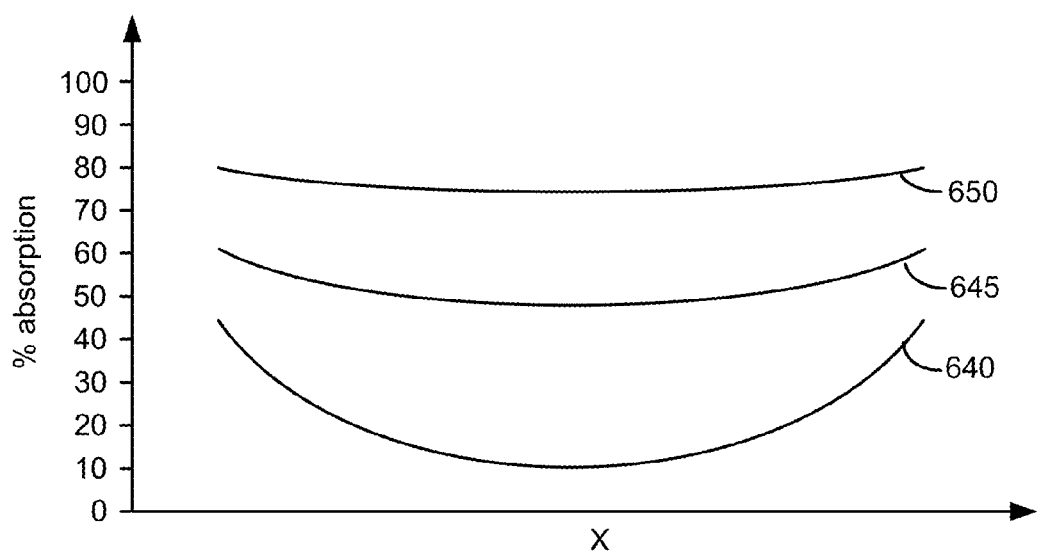

FIG. 6D is a graph showing plots of the percent absorption of visible light through electrochromic lite 600 when it is transitioning from a bleached state to a colored state due to the application of the voltages applied to first bars 605 and 607 and second bus bars 615 and 617 in FIG. 6B. Plot 640 is the percent absorption across electrochromic lite 600 a short time after application of the voltages. In plot 640 the edges of electrochromic lite 600 have transitioned faster than the center of electrochromic lite 600; the edges would transition faster than the edges of electrochromic lite 500. Plot 645 is the percent absorption across electrochromic lite 600, midway through the transition from a bleached state to a colored state. In plot 645, electrochromic lite 600 is more colored (i.e., higher percent absorption of light), but there is still a drop in the absorption of light at the center of electrochromic lite 600. Plot 650 is the percent absorption across electrochromic lite 600 when the lite is in a fully colored state. As shown, the percent absorption of light may not be uniform across electrochromic lite 600 in the fully colored state due to the effective voltage drop across electrochromic lite 600 (see FIG. 6C), but this may not be perceptible to the human eye.

Advantages of cylindrical bus bar configurations include a shorter duration curtain effect and a shorter transition time of an electrochromic compared to planar bus bar configurations. The first and second bus bars being close to one another, however, may cause hot spots in the electrochromic device.

Figure 7A:
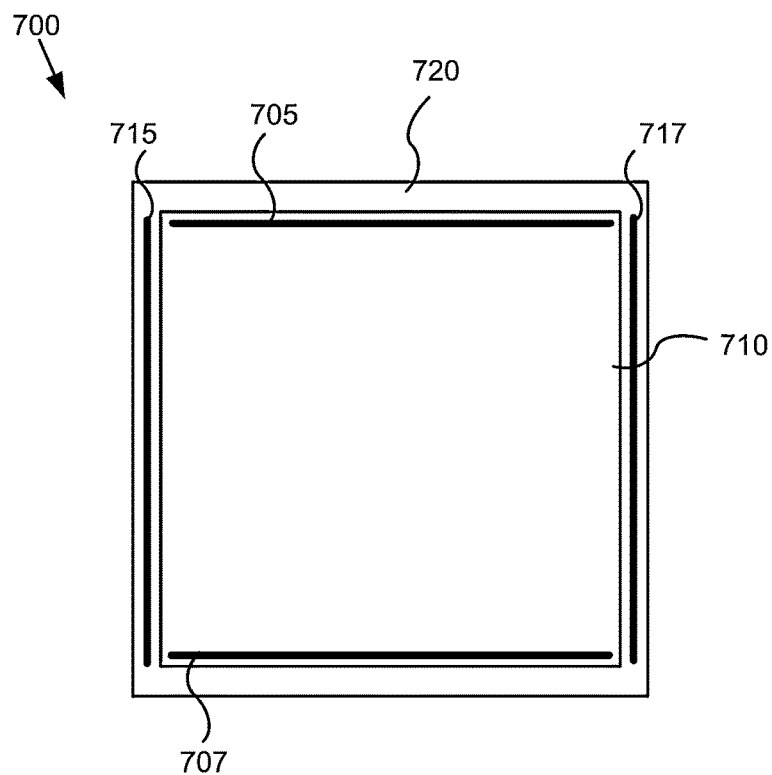
FIG. 7A shows a schematic diagram of an electrochromic lite with perpendicular cylindrical bus bars.

FIG. 7A shows a top-down view of an electrochromic lite, 700, including bus bars having a perpendicular cylindrical configuration. Electrochromic lite 700 includes first bus bars, 705 and 707, disposed on a first conductive layer, 710, and second bus bars, 715 and 717, disposed on a second conductive layer, 720. An electrochromic stack (not shown) is between first conductive layer 710 and second conductive layer 720. First bus bars 705 and 707 extend substantially across two opposing sides of first conductive layer 710. Second bus bars 715 and 717 extend substantially across two opposing sides of second conductive layer 720. As shown, first bus bars 705 and 707 and second bus bars 715 and 717 are at locations such that the first bus bars are substantially perpendicular to the second bus bars. To transition electrochromic lite 700 between optical states, the same voltage may be applied to both of first bus bars 705 and 707 (i.e., first bus bars 705 and 707 may be connected in parallel). The same voltage may be applied to both of second bus bars 715 and 717 (i.e., second bus bars 715 and 717 may be connected in parallel).

Figure 7B:
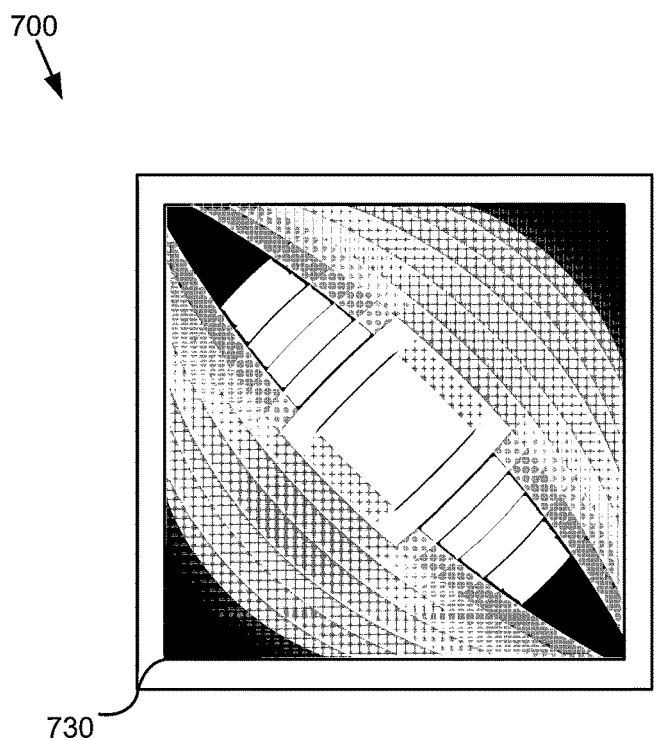
FIG. 7B shows a diagram associated with the operation of the electrochromic lite shown in FIG. 7A.

FIG. 7B shows the coloration of electrochromic lite 700 at a time midway through the transition from a bleached state to a colored state. As shown in FIG. 7B, the corners of electrochromic lite 700 color first due to high effective voltages at the corners. For example, the high effective voltage at a corner, 730, of electrochromic lite 700 is due to first bus bar 707 and second bus bar 715 being close to one another at corner 730. The center of electrochromic lite 700 is the last portion of the electrochromic lite to transition from the bleached state to the color state.

An advantage of perpendicular cylindrical bus bar configurations is that they may allow for more symmetric coloration (i.e., from the corners to the center) of an electrochromic lite. However, perpendicular cylindrical bus bar configurations are prone to hot spots at the corners of an electrochromic lite and damage the electrochromic device, because of the proximity of oppositely polarized bus bars at the corners of the device. For example, to obtain the desired coloration in the center of an electrochromic lite, the corners may be overdriven, which increases the leakage current of the electrochromic device as well as the likelihood of device damage/degradation.

Angled Bus Bars

Instead of the planar, cylindrical, or perpendicular cylindrical bus bar configurations described above with respect to FIG. 5A-7B, an angled bus bar may be included in some embodiments of electrochromic lites or other optically switchable devices. An angled bus bar may include two arms that meet at an end of each of the arms, forming an angle between the two arms. For example, the two arms may form an L-shape or a V-shape. In some embodiments, an electrochromic lite including at least one angled bus bar may transition between optical states faster and exhibit a more symmetric transition between optical states. Further, an angled bus bar may be configured such that hot spots in an electrochromic device are substantially minimized.

Figure 8A:
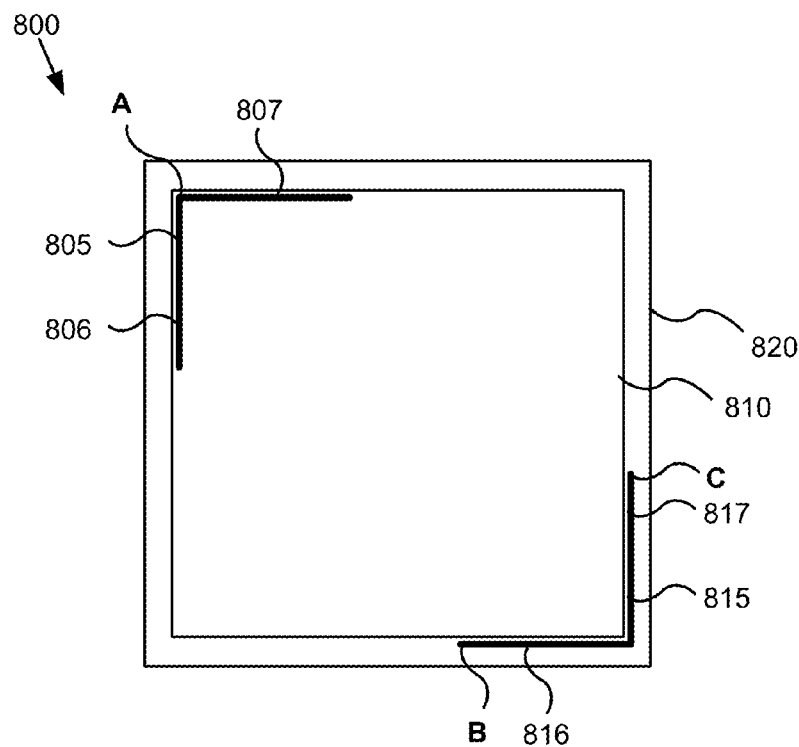
FIG. 8A shows a schematic diagram of a square-shaped electrochromic lite with angled bus bars.

FIG. 8A shows a top-down view of a square-shaped electrochromic lite, 800, including angled bus bars. Electrochromic lite 800 is depicted in the bleached state in FIG. 8A. Electrochromic lite 800 includes a first bus bar, 805, disposed on a first conductive layer, 810, and a second bus bar, 815, disposed on a second conductive layer, 820. An electrochromic stack (not shown) is between first conductive layer 810 and second conductive layer 820. As shown, first conductive layer 810 and second conductive layer 820 both have a perimeter with corners including sides and vertices. The electrochromic stack between first conductive layer 810 and second conductive layer 820 may also have a perimeter with corners including sides and vertices similar to first conductive layer 810 and second conductive layer 820.

First bus bar 805 is disposed on first conductive layer 810 proximate to a corner of first conductive layer 810. First bus bar 805 include a first arm, 806, and a second arm, 807, that substantially follow the shape of a first side, a first vertex, and a second side of a corner of first conductive layer 810, respectively. Second bus bar 815 is disposed on second conductive layer 820 proximate to a corner of second conductive layer 820. Second bus bar 815 includes a first arm, 816, and a second arm, 817 that substantially follow the shape of a first side, a first vertex, and a second side of a corner of second conductive layer 820, respectively. In some embodiments, a first bus bar and a second bus bar may have configurations that are substantially similar. For example, in some embodiments, the arms of the first and second bus bars are of substantially equal length. In some embodiments, a first bus bar and a second bus bar may be substantially symmetric to one another.

In some embodiments, the first and the second arms of the bus bars may span about 10% to 90%, about 10% to 65%, or about 35% to 65% of the length of the respective sides of the electrochromic device area. In some embodiments, a first arm of a first bus bar has a length about 10% to 40%, about 35% to 65%, or about 60% to 90% of a length of the first side of the electrochromic device. In some embodiments, the first and the second arms of the bus bars may be substantially perpendicular. In some embodiments, each of the first and second bus bars may span sides defining diagonally opposing corners of the electrochromic lite.

Figure 8B:
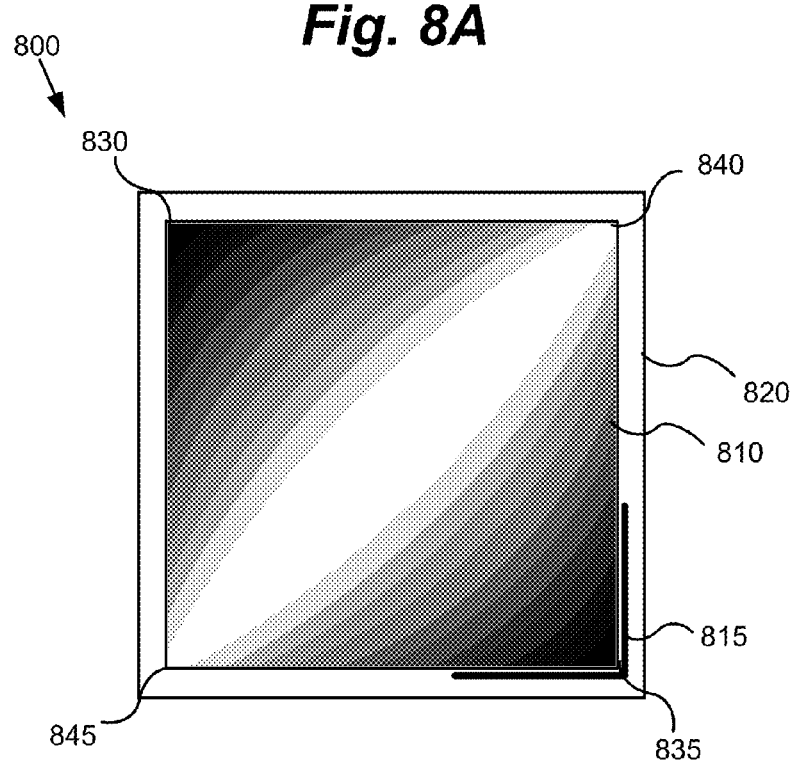
FIG. 8B shows a diagram associated with the operation of the electrochromic lite shown in FIG. 8A.

FIG. 8B shows the coloration of electrochromic lite 800 at a time midway through the transition from a bleached state to a colored state. As shown in FIG. 8B, corners, 830 and 835, of electrochromic lite 800 where bus bars 805 and 815 are disposed, color first. The center band of electrochromic lite 800, from corners, 840 and 845, is the last portion of electrochromic lite 800 to transition from the bleached state to the colored state.

While first conductive layer 810 and second conductive layer 820 are shown as having a substantially square shape in electrochromic lite 800, the conductive layers and the electrochromic stack disposed there between may have any shape, including other polygons or rectangles.

Figure 8C:
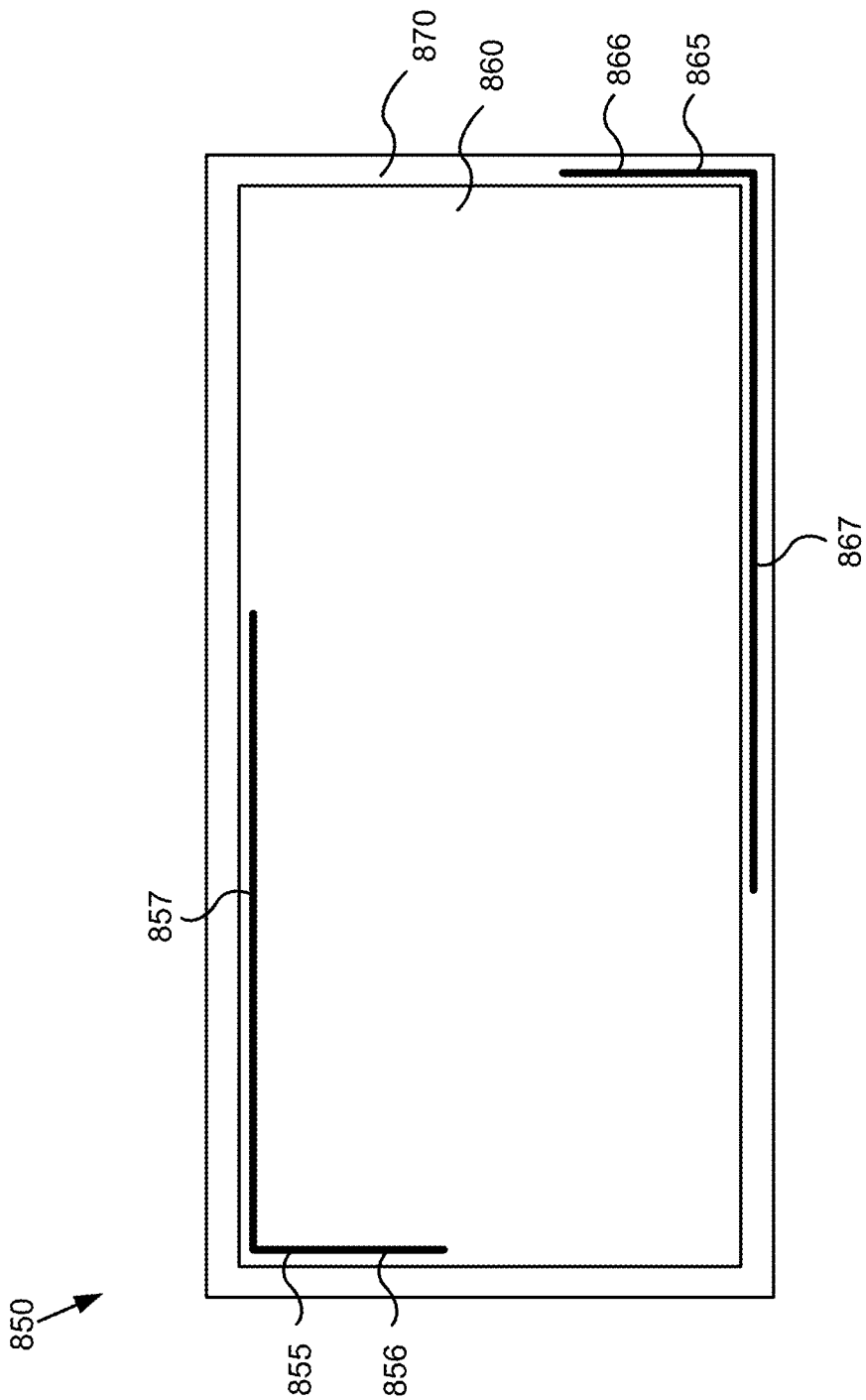
FIG. 8C shows a schematic diagram of a rectangle-shaped electrochromic lite with angled bus bars.

FIG. 8C shows a top-down view of a rectangular electrochromic lite, 850, including angled bus bars. Electrochromic lite 850 includes a first bus bar, 855, disposed on a first conductive layer, 860, and a second bus bar, 865, disposed on a second conductive layer, 870. An electrochromic stack (not shown) is between first conductive layer 860 and second conductive layer 870. First bus bar 855 is disposed on first conductive layer 860 proximate to a corner of first conductive layer 860. First bus bar 855 includes a first arm, 856, and a second arm, 857, which substantially follow the shape of a first side, a first vertex, and a second side of a corner of first conductive layer 860. Second bus bar 865 is disposed on second conductive layer 870 proximate to a corner of second conductive layer 870. Second bus bar 865 includes a first arm, 866, and a second arm, 867, which substantially follow the shape of a first side, a first vertex, and a second side of a corner of second conductive layer 870. First and second bus bars 855 and 865 are disposed on diagonally opposing corners of electrochromic lite 850. In some embodiments, a first bus bar and a second bus bar may have configurations that are substantially similar.

In some embodiments, second arm 857 and 867 of each of first and second bus bars 855 and 865, respectively, traverse a portion of a longer side of electrochromic lite 850. First arms 856 and 866 of each of first and second bus bars 855 and 865, respectively, traverse a portion of a shorter side of electrochromic lite 850. In some embodiments, the first arms and the second arms of first and second bus bars 855 and 865 are substantially orthogonal to one another. In some embodiments, first arms 856 and 866 span about 25% to 75% of the shorter side. In some embodiments, second arms 857 and 867 span about 75% to 90% of the longer side.

In some embodiments, including at least one angled bus bar in an electrochromic lite, as in electrochromic lites 800 and 850 described above with respect to FIGS. 8A and 8C, may allow for semi-symmetric coloration (i.e., from two corners to the center) of an electrochromic lite. When transitioning from a bleached state to a colored state, all sides of the electrochromic lite may begin to color at similar rates (i.e., side preference coloration may be substantially eliminated), which reduces the asymmetry of the curtain effect. Further, the hot spots generated by, for example, perpendicular cylindrical bus bar configurations are avoided in angled bus bar configurations. Further, the transition between optical states may occur more rapidly with angled bus bar configurations than with planar bus bar configurations without overdriving regions of the electrochromic lite, as with some cylindrical or perpendicular cylindrical bus bar configurations. FIGS. 9-12B show top-down views of electrochromic lites including angled bus bars in different configurations.

Figure 9:
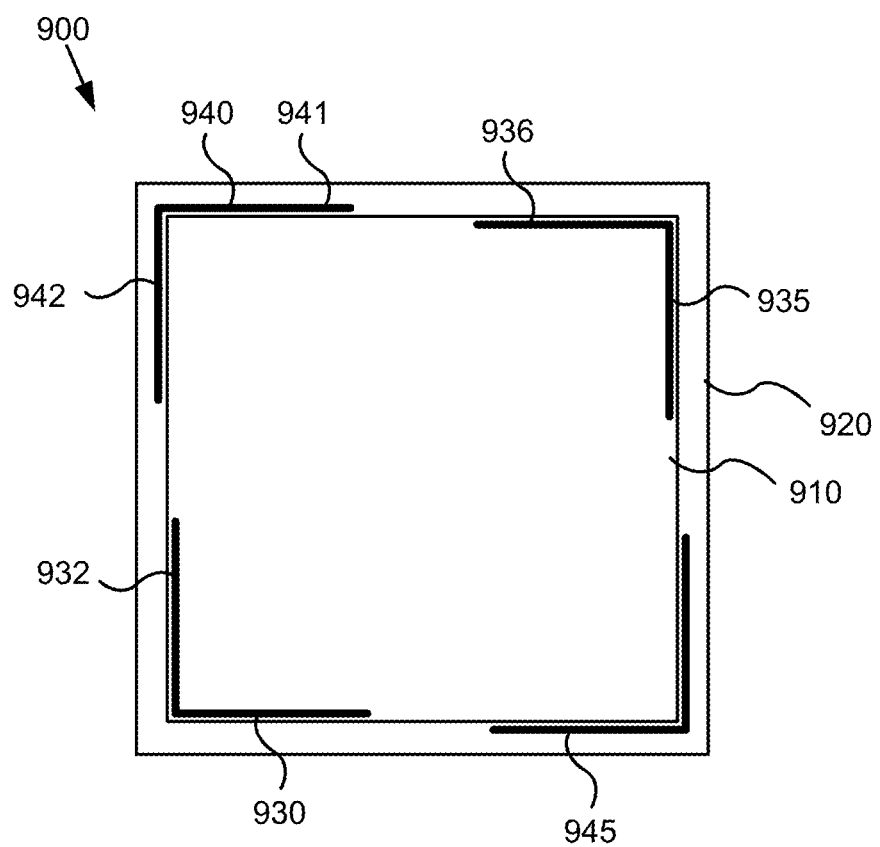
FIGS. 9-11 shows schematic diagrams of electrochromic lites including angled bus bars in different configurations.

Referring to FIG. 9, an electrochromic lite, 900, includes first bus bars, 930 and 935, disposed on a first conductive layer, 910, and second bus bars, 940 and 945, disposed on a second conductive layer, 920. An electrochromic stack (not shown) is between first conductive layer 910 and second conductive layer 920. As shown, the first conductive layer 910 and the second conductive layer 920 both have a perimeter with corners including sides and vertices. The electrochromic stack between first conductive layer 910 and second conductive layer 920 may also have a perimeter with corners including sides and vertices similar to first conductive layer 910 and second conductive layer 920.

First bus bar 930 is disposed on first conductive layer 910 proximate to a corner of first conductive layer 910. First bus bar 935 is disposed on first conductive layer 910 proximate to a corner of first conductive layer 910 diagonally opposed to first bus bar 930. Similarly, second bus bar 940 is disposed on second conductive layer 920 proximate to a corner of second conductive layer 920. Second bus bar 945 is disposed on second conductive layer 920 proximate to a corner of second conductive layer 920 diagonally opposed to second bus bar 940. To transition electrochromic lite 900 between optical states, the same voltage may be applied to both of first bus bars 930 and 935 (i.e., first bus bars 930 and 935 may be connected in parallel). The same voltage may be applied to both of second bus bars 940 and 945 (i.e., second bus bars 940 and 945 may be connected in parallel).

Each of the bus bars includes arms that follow the shapes of the sides and the vertex of the corner with which the bus bar is associated. Arms of first bus bars 930 and 935 are not in close proximity to arms of second bus bars 940 and 945 in order to avoid hot spots, in some embodiments. For example, arm, 941, of second bus bar 940 extends along the side of second conductive layer 920. Arm, 936, of first bus bar 935 extends along the side of first conducive layer 910, with these sides of first conductive layer 910 and second conductive layer 920 being substantially parallel. In some embodiments, the ends of arms 941 and 936 do not overlap with one another (e.g., as the bus bars in a cylindrical configuration do), and in some other embodiments, the ends of arms 941 and 936 are not in close proximity to one another. The length of arm, 942, of second bus bar 940 and the length of arm, 932, of first bus bar 930, may be specified in a similar manner in order to avoid hot spots.

Figure 10:
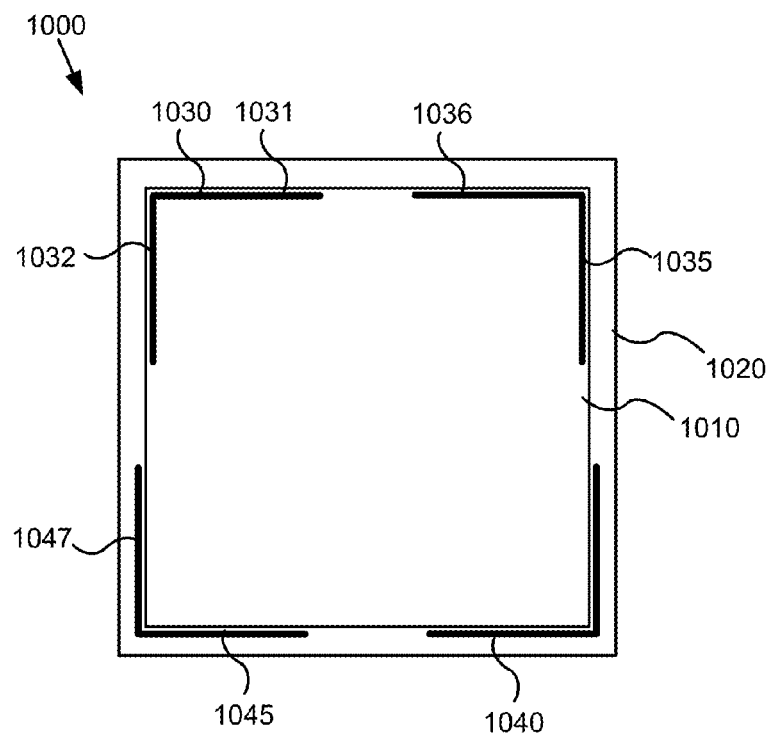

FIG. 10 shows a top-down view of an electrochromic lite, 1000, including angled bus bars. The bus bar configuration of electrochromic lite 1000 is similar to the bar configuration of electrochromic lite 900 shown in FIG. 9, but instead of the first bus bars being diagonally opposed to one another, each of the first bus bars is diagonally opposed to a second bus bar. Electrochromic lite 1000 includes first bus bars, 1030 and 1035, disposed on a first conductive layer, 1010, and second bus bars, 1040 and 1045, disposed on a second conductive layer, 1020. An electrochromic stack (not shown) is between first conductive layer 1010 and second conductive layer 1020. As shown, the first conductive layer 1010 and the second conductive layer 1020 both have a perimeter with corners including sides and vertices. The electrochromic stack between first conductive layer 1010 and second conductive layer 1020 may also have a perimeter with corners including sides and vertices similar to first conductive layer 1010 and second conductive layer 1020.

First bus bar 1030 is disposed on first conductive layer 1010 proximate to a corner of first conductive layer 1010. Second bus bar 1040 is disposed on second conductive layer 1020 proximate to a corner of second conductive layer 1020 diagonally opposed to first bus bar 1030. Similarly, first bus bar 1035 is disposed on first conductive layer 1010 proximate to a corner of first conductive layer 1010. Second bus bar 1045 is disposed on second conductive layer 1020 proximate to a corner of second conductive layer 1020 diagonally opposed to first bus bar 1035. To transition electrochromic lite 1000 between optical states, the same voltage may be applied to both of first bus bars 1030 and 1035 (i.e., first bus bars 1030 and 1035 may be connected in parallel). The same voltage may be applied to both of second bus bars 1040 and 1045 (i.e., second bus bars 1040 and 1045 may be connected in parallel).

Again, similar to electrochromic lite 900, each of the bus bars of electrochromic lite 1000 includes arms that follow the shapes of the sides and the vertex of the corner with which the bus bar is associated. The end portion of the arms of first bus bars 1030 and 1035 are not in close proximity to the ends of the arms of second bus bars 1040 and 1045 in order to avoid hot spots, in some embodiments. For example, arm, 1032, of first bus bar 1030 extends along the side of first conductive layer 1010. Arm, 1047, of second bus bar 1045 extends along the side of second conducive layer 1020. In some embodiments, the ends of arms 1032 and 1047 do not overlap with one another (e.g., as the bus bars in a cylindrical configuration do), and in some other embodiments, the ends of arms 1032 and 1047 are not in close proximity to one another. The lengths of the arms of first bus bar 1035 and second bus bar 1040 may be specified in a similar manner to avoid hot spots. In another embodiment, the bus bars depicted in FIG. 10 are arranged such that bus bar 1040 and 1045, while still on the lower electrode, are diagonally opposed, and bus bars 1030 and 1035, while remaining on the upper electrode, are also diagonally opposed.

Figure 11:
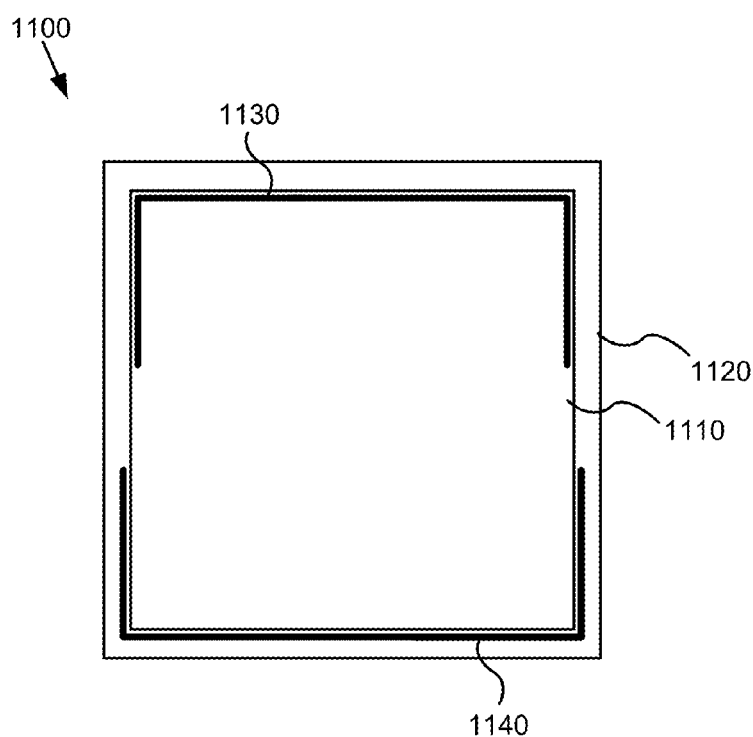

Arm, 1031, of first bus bar 1030 and arm, 1036, of first bus bar 1035, along the same side of first conductive layer 1010, may have lengths such that the electrochromic lite 1000 transitions between optical states in a short time period of time. The arms of second bus bars 1040 and 1045 along the same side of second conductive layer 1020 also may have lengths such that the electrochromic device transitions between optical states in a short time period of time. In some embodiments, the arms of the first bus bars may meet, forming a single C-shaped first bus bar. In some embodiments, the arms of the second bus bars may meet, forming a single C-shaped second bus bar. This embodiment is shown in FIG. 11. Electrochromic lite 1100 shown in FIG. 11 includes a first bus bar, 1130, disposed on a first conductive layer, 1110, and a second bus bar, 1140, disposed on a second conductive layer, 1120. Note, for example, as described above in relation to FIG. 11, an angled bus bar may have more than one angled feature (see bus bars 1130 and 1140, each having two angles). One embodiment is an angled bus bar having two or more angles.

Figure 12A:
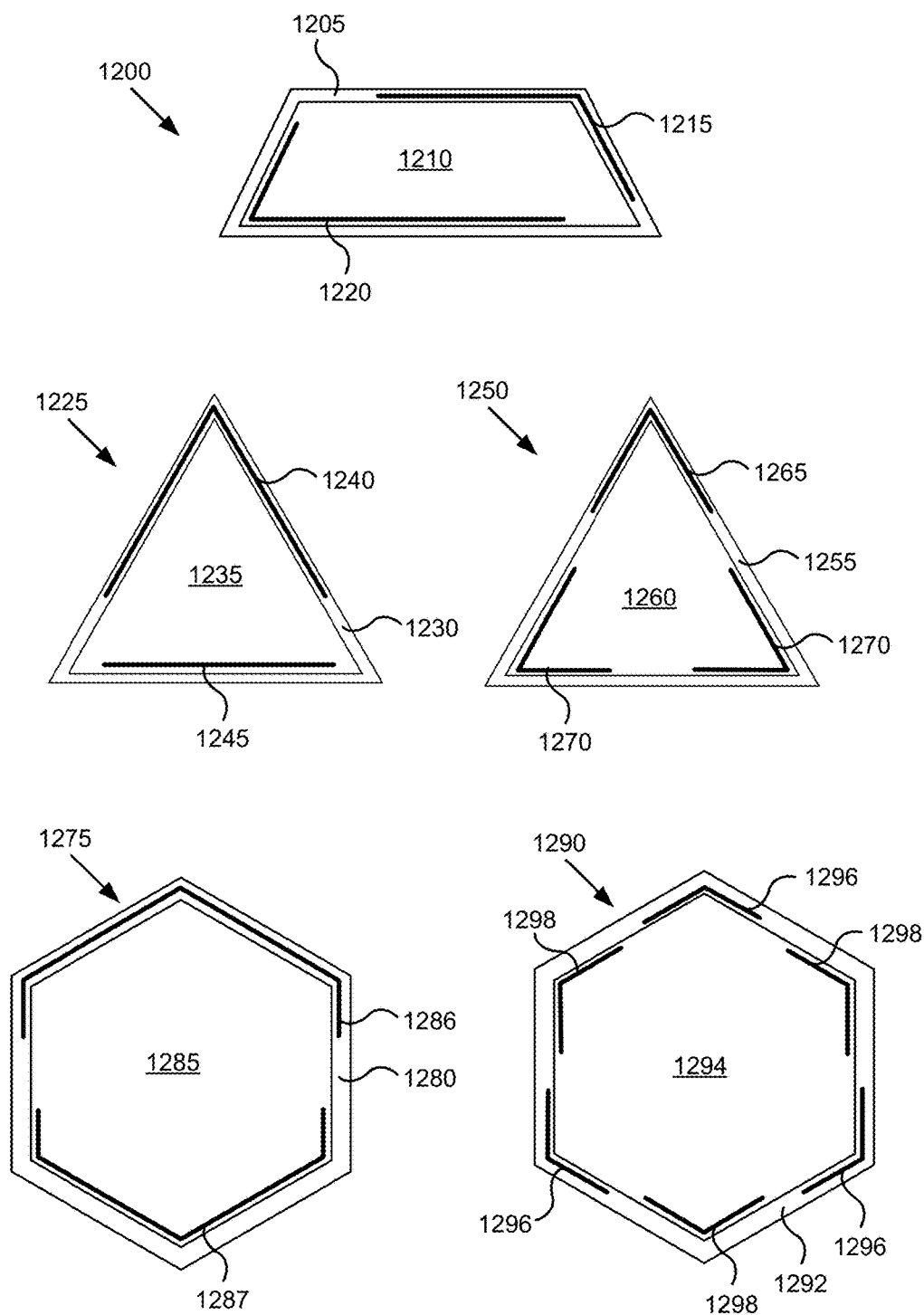
FIG. 12A shows schematic diagrams of electrochromic lites of varying shapes including angled bus bars in different configurations.

The angle between the two arms of an angled bus bar may approach 180 degrees and may also be smaller than 90 degrees. For the purposes of illustration only, the embodiments above are described in terms of rectangular electrochromic lites, however, non-rectangular shapes and other optical devices are meant to be included within the scope of the disclosed embodiments. FIG. 12A depicts top view schematics of a number of electrochromic lites of varying shapes and angled bus bar configurations. For example, an electrochromic window, 1200, has a trapezoidal shape and two bus bars. A lower transparent electrode surface, 1205, bears an angled bus bar, 1215, while an upper transparent electrode, 1210, has another angled bus bar, 1220. In this example, bus bar 1215 has an angle larger than 90 degrees, while bus bar 1220 has an acute angle, less than 90 degrees. Depending upon the shape of the electrochromic lite, the bus bars may or may not be symmetrical or span the same length on each arm or have the same total length. As well, an electrochromic lite may have a combination of angled and non-angled bus bars. For example, triangular lite, 1225, has an angled bus bar, 1240, on a lower electrode 1230, and a linear bus bar, 1245, on an upper electrode, 1235. In another example, triangular electrochromic lite, 1250, has a single angled bus bar, 1265, on a lower electrode, 1255, while also having two angled bus bars, 1270, on an upper electrode, 1260. The shape and orientation of the bus bars will depend on the shape of the window, the switching and/or energy requirements of the device they power, and the like, e.g., in order to maximize efficient switching and/or powering, homogeneity in transitions, and to minimize hotspots. In another example, a hexagonal electrochromic lite, 1275, has a first angled bus bar, 1286, on a lower electrode, 1280, and a second angled bus bar, 1287, on an upper electrode, 1285. In this example, angled bus bars 1286 and 1287 each have three angle features (vertices). In another example, a hexagonal electrochromic lite, 1290, has six angled bus bars. On a lower electrode, 1292, there are three angled bus bars, 1296, and on an upper electrode, 1294, there are also three angled bus bars, 1298. Driving algorithms for electrochromic lites are described in more detail below, particularly, in relation to angled bus bars and devices having more than two bus bars.

Figure 12B:
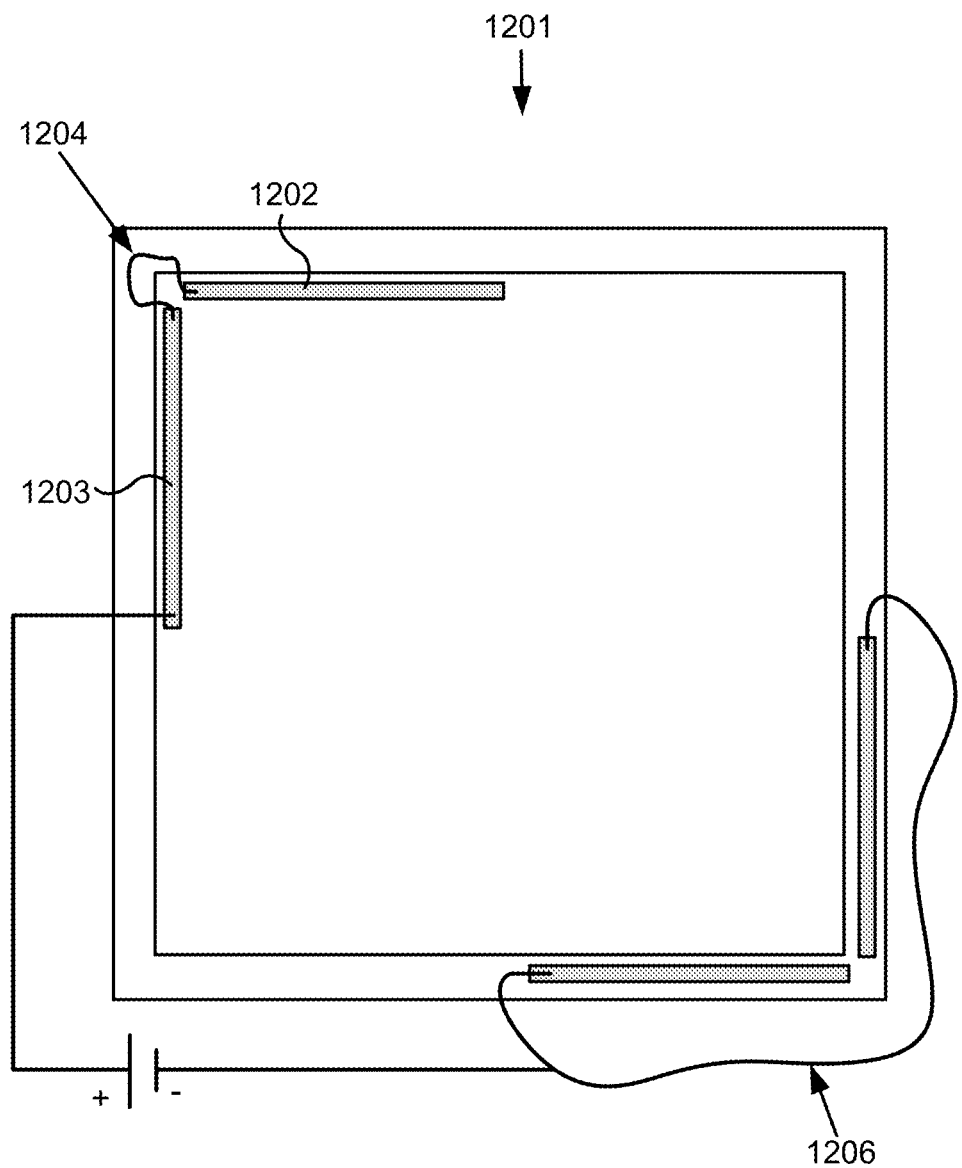
FIG. 12B shows schematic diagrams of angled bus bars in alternative configurations.

Angled bus bars are described herein in terms of having at least a first arm and a second arm joined at a vertex, e.g., as depicted and described in relation to FIG. 12A (some examples in FIG. 12A illustrate that there may be more vertices and arms in certain embodiments). In certain embodiments, angled bus bars do not have a physical vertex. Referring to FIG. 12B, there are configurations that are equivalent, and therefore considered, angled bus bars for the purposes of this disclosure. For example, electrochromic device 1201 has associated bus bar arms, 1202 and 1203, which are electrically connected via a wire 1204. Wire 1204 could also be a thin strip of bus bar material or other suitable electrical connector. Although there is not a physical vertex per se, this assembly is an angled bus bar because there is a virtual vertex, that is, a theoretical point in space that is an intersection of two axes, each axis passing through the length of each bus bar arm. Likewise, similarly situated bus bar arms electrically connected by a wire, 1206, at their distal ends would also be an angled bus bar. Note, in FIG. 12B, the electrical source can be connected via the wire or other connector, or on one (or both) of the bus bar arms. In one embodiment, if the proximal ends of two bus bar arms are: 1) at some angle relative to each other as described herein for bus bar arms having a physical vertex, 2) within about 1 mm and about 100 mm of each other, 3) in electrical communication with each other, and 4) on the same conductive layer of a device, then they are, collectively, an angled bus bar. In another embodiment, if two bus bar arms: 1) each span about 10% to 90%, about 10% to 65%, or about 35% to 65% of the length of two sides of an electrochromic device area, 2) are at some angle relative to each other as described herein for bus bar arms having a physical vertex, 3) are in electrical communication with each other, and 4) are on the same conductive layer of a device, then they are, collectively, an angled bus bar. For the purposes of these definitions, "electrical communication with each other" does not include the electrical communication via the conductive layer on which the pair of bus bar arms reside.

In certain embodiments, the bus bar arms need not be in electrical communication with each other. For example, in one embodiment, if two bus bar arms: 1) each span about 10% to 90%, about 10% to 65%, or about 35% to 65% of the length of two sides of an electrochromic device area, 2) are at some angle relative to each other as described herein for bus bar arms having a physical vertex, 3) are on the same conductive layer of a device, and 4) are independently held at the same polarity, either a negative or a positive polarity, then they are, collectively, an angled bus bar. In another embodiment, if the proximal ends of two bus bar arms are: 1) at some angle relative to each other as described herein for bus bar arms having a physical vertex, 2) within about 1 mm and about 100 mm of each other, 3) are independently held at the same polarity, either a negative or a positive polarity, and 4) on the same conductive layer of a device, then they are, collectively, an angled bus bar. In these embodiments, is it useful, but not necessary, if the polarity applied to each of the angled bus bar's arms is similar in magnitude. These angled bus bars, although requiring more complex drive circuits, will transition the electrochromic device as those having a physical vertex or one having a virtual vertex and having the arms electrical communication with each other. The objectives of avoiding hotspots and improving optical transitions remains the same, and are met with appropriate configurations as described herein in relation to angled bus bars having physical vertices.

In some embodiments, bus bar configurations described herein may not develop hot spots in an optically switchable device while transitioning the optically switchable device between optical states. Further, the bus bar configurations described herein may be modified and/or combined, depending on the application. For example, in some embodiments, an optically switchable device may have the shape of a polygon, a trapezoid, or a shape with one region that substantially forms a corner with other regions having curved borders; bus bars may be disposed on the first and second conductive layers in a manner that substantially minimizes hot spots, substantially minimizes the curtain effect, and quickly transitions the optically switchable device between optical states.

In some embodiments, the lengths of the first bus bars along the edges of the first conductive layer and the lengths of the second bus bars along the edges of the second conductive layer are substantially maximized without developing hot spots in an optically switchable device between the first and second conductive layers. Substantially maximizing the lengths of the first and the second bus bars may aid in quickly transitioning the optically switchable device between optical states.

Generally, for fast switching between optical states of an optically switchable device, the first and the second bus bars should be as close to one another as possible, due to the inherent resistance of the conducting layers (e.g., the TCO) of the device. Having the first and the second bus bars close to each other, however, generates hot spots in the optically switchable device, as explained above. In some embodiments, the first and the second bus bars are configured such that distances between extremities of the first bus bar and portions of the second bus bar are substantially minimized to aid in quickly transitioning the optically switchable device without developing hot spots. Similarly, distances between extremities of the second bar and portions of the first bus bar are substantially minimized. For example, referring to FIG. 8A, a corner, A, of first bus bar 805 is an extremity of first bus bar 805. It is a point of first bus bar 805 that is furthest away from any part of second bus bar 815. The portions of second bus bar 815 that are closest to corner A of first bus bar 805 are ends, B and C, of arms 816 and 817, respectively, of second bus bar 815. Thus, to aid in quickly transitioning between optical states, the distance between corner A of first bus bar 805 and either end B or C of second bus bar 815 may be substantially minimized.

Methods of Changing Optical States

Figure 13:
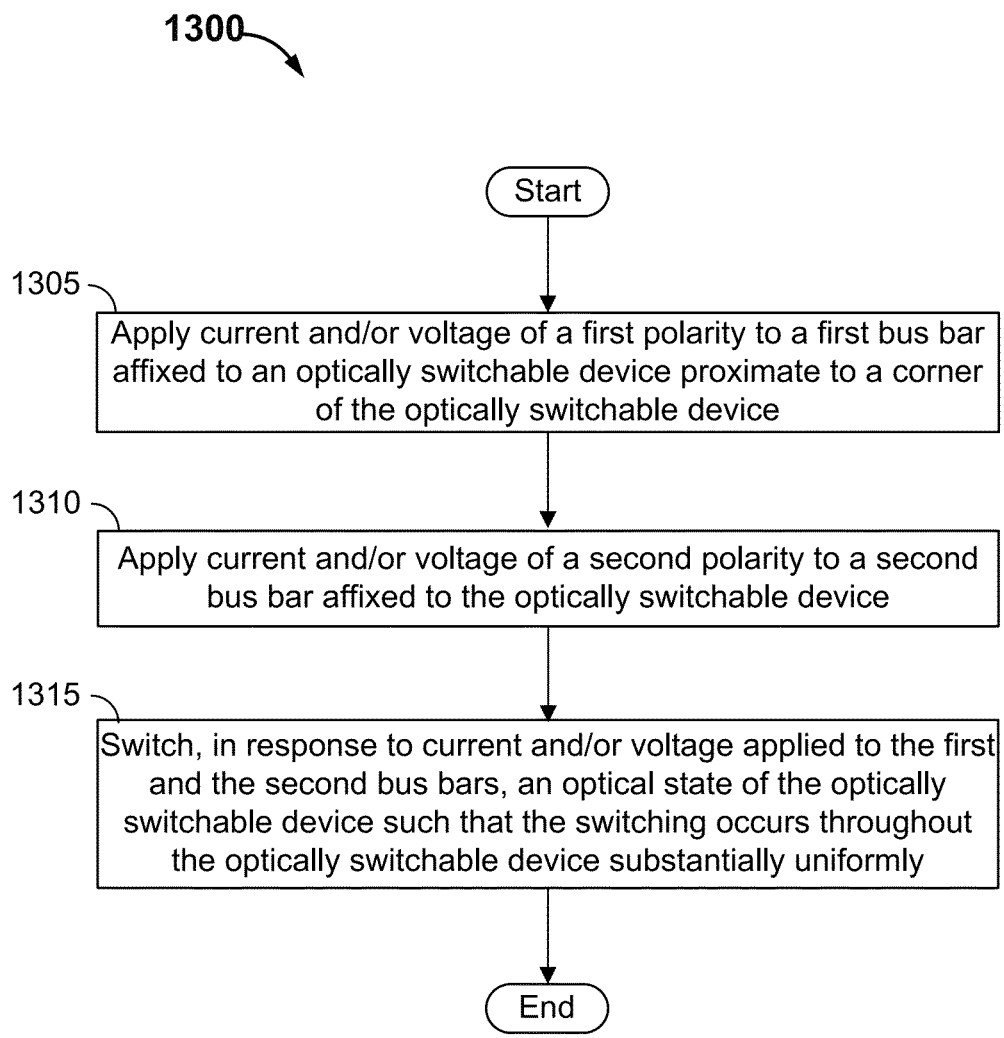
FIG. 13 shows a flowchart depicting a method of changing an optical state of an optically switchable device.

FIG. 13 shows a flowchart depicting a method of changing an optical state of an optically switchable device. The method 1300 shown in FIG. 13 describes changing an optical state of an optically switchable device that may be similar to the electrochromic lite 800 shown in FIG. 8A or the electrochromic lite 850 shown in FIG. 8C. That is, method 1300 describes changing an optical state of an optically switchable device disposed on a surface of a substrate and having a perimeter with at least one corner including a first side, a first vertex joining the first side and a second side, and the second side. Method 1300 may be used to transition any of the optically switchable devices including an angled bus bar disclosed herein.

Staring with operation 1305 of method 1300, current and/or voltage of a first polarity is applied to a first bus bar affixed to the optically switchable device proximate to the corner. The first bus bar includes a first arm and a second arm having a configuration that substantially follows the shape of the first side, the first vertex, and the second side of the corner. For example, the first bus bar referred to in operation 1305 could be first bus bar 805 of electrochromic lite 800 shown in FIG. 8A.

At operation 1310, current and/or voltage of a second polarity is applied to a second bus bar affixed to the optically switchable device. The second bus bar referred to in operation 1310 could be second bus bar 815 of electrochromic lite 800 shown in FIG. 8A. However, as described in operation 1310, the second bus bar could have any number of different configurations, and is not necessarily an angled bus bar.

At operation 1315, in response to the current and/or voltage applied to the first and the second bus bars, an optical state of the optically switchable device switches such that the switching occurs throughout the optically switchable device substantially uniformly. In some embodiments, having at least one angled bus bar included in an optically switchable device may allow the optically switchable device to transition between optical states more uniformly than the planar, cylindrical, or perpendicular cylindrical bus bar configurations described with respect to FIGS. 5A-7B.

Having at least one angled bus bar included in an optically switchable device may also allow the optically switchable device to switch between optical states faster than the planar, cylindrical, or perpendicular cylindrical bus bar configurations. For example, in some embodiments, switching the optical state of the optically switchable device from a first optical state to a second optical state is performed in about 10 minutes or less. Of course, the switching may depend on a number of factors, e.g., the area of the electrochromic device, the sheet resistance of the conductor layers, etc.; however, in one embodiment, the 10 minute or less switching speed applies to an optically switchable device having an area of between about 1 square foot (0.09 m$^2$) and about 60 square feet (5.57 m$^2$), in another embodiment between about 6 square feet (0.56 m$^2$) and about 30 square feet (2.79 m$^2$), and in yet another embodiment, between about 10 square feet (0.93 m$^2$) and about 20 square feet (1.86 m$^2$). Further, having at least one angled bus bar included in an optically switchable device may allow the optically switchable device to switch between optical states without developing hot spots in the optically switchable device. For example, switching the optical state of the optically switchable device may be performed such that the current and/or the voltage applied across the optically switchable device does not damage the optically switchable device.

When more than two bus bars are configured on a device, one embodiment includes a driving algorithm that drives successive pairs of bus bars. For example, referring to FIG. 12, electrochromic lite 1290, a driving algorithm may include powering opposing pairs of bus bars 1296 and 1298, serially, e.g., in a clockwise, counter clockwise, or random manner, rather than energizing all the bus bars at simultaneously. In another example, referring to FIG. 10, bus bars on opposing corners of the EC device may be powered as pairs, serially, where only two bus bars are energized at any single moment in time. Using this driving algorithm, hot spots can be further avoided, and, because only opposing single pairs of bus bars are energized at any one time, the ends of the bus bars can be closer to each other, even overlapping (i.e., running parallel, side by side but on different electrodes) because only opposing pairs are energized in any single moment in time. Opposing pairs need not be used; the bus bar pairs may include adjacent bus bars, e.g., those described in relation to FIG. 10, where the ends of the bus bars are spaced appropriately to avoid hot spots.

Methods of Fabrication

Figure 14:
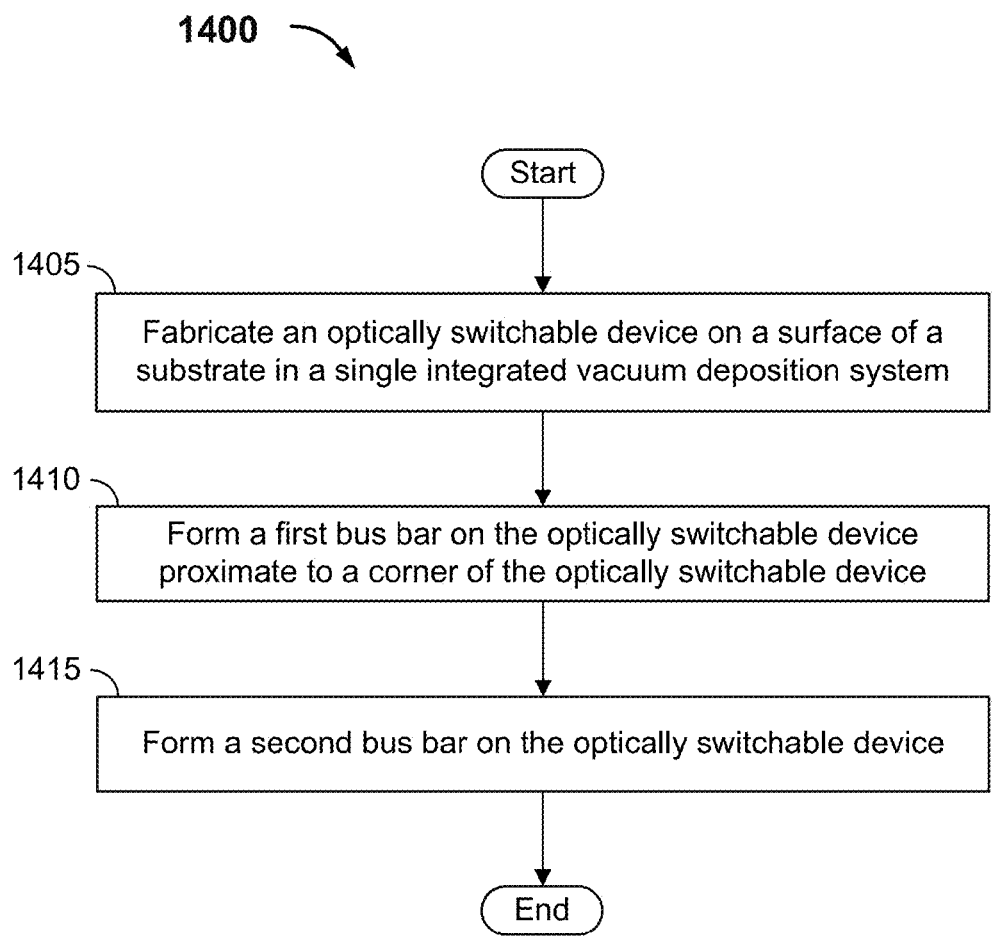
FIG. 14 shows a flowchart depicting a method of fabricating an optically switchable device.

FIG. 14 shows a flowchart depicting a method of fabricating an optically switchable device. The method 1400 shown in FIG. 14 describes a method of fabricating a general optically switchable device. Method 1400 may be used to fabricate any of the optically switchable devices including an angled bus bar disclosed herein. The details of forming the optically switchable device would depend on the specific optical device being fabricated, however. For example, method 1400 may be used to fabricate the electrochromic lite 800 shown in FIG. 8A or the electrochromic lite 850 shown in FIG. 8C and associated bus bars. Further details regarding the fabrication of electrochromic devices and lites are disclosed in U.S. patent application Ser. No. 12/645,111, filed Dec. 22, 2009, U.S. patent application Ser. No. 12/645,159, filed Dec. 22, 2009, U.S. patent application Ser. No. 12/772,055, filed Apr. 30, 2010, U.S. patent application Ser. No. 12/772,075, filed Apr. 30, 2010, U.S. patent application Ser. No. 12/814,277, filed Jun. 11, 2010, U.S. patent application Ser. No. 12/814,279, filed Jun. 11, 2010, and U.S. patent application Ser. No. 13/166,537, filed Jun. 22, 2011, all of which are incorporated by reference herein for all purposes.

Starting at operation 1405 of method 1400, an optically switchable device is fabricated on a surface of a substrate in a single integrated vacuum deposition system. During the fabrication process, the substrate is in a substantially vertical orientation in the integrated vacuum deposition system. The optically switchable device includes a perimeter with at least one corner including a first side, a first vertex joining the first side and a second side, and the second side.

At operation 1410, a first bus bar is formed on the optically switchable device proximate to the corner. The first bus bar includes a first arm and a second arm having a configuration that substantially follows the shape of the first side, the first vertex, and the second side of the corner. The first bus bar is configured to deliver current and/or voltage for driving switching of the optically switchable device.

At operation 1415, a second bus bar is formed on the optically switchable device. The second bus bar is configured to deliver current and/or voltage for driving switching of the optically switchable device. In some embodiments, the optically switchable device may include a perimeter with a second corner including a third side, a second vertex joining the third side and a fourth side, and the fourth side. The second bus bar may include a third arm and a fourth arm having a configuration that substantially follows the shape of the third side, the second vertex, and the fourth side of the second corner.

Angled Bus Bar Performance

Figure 15:
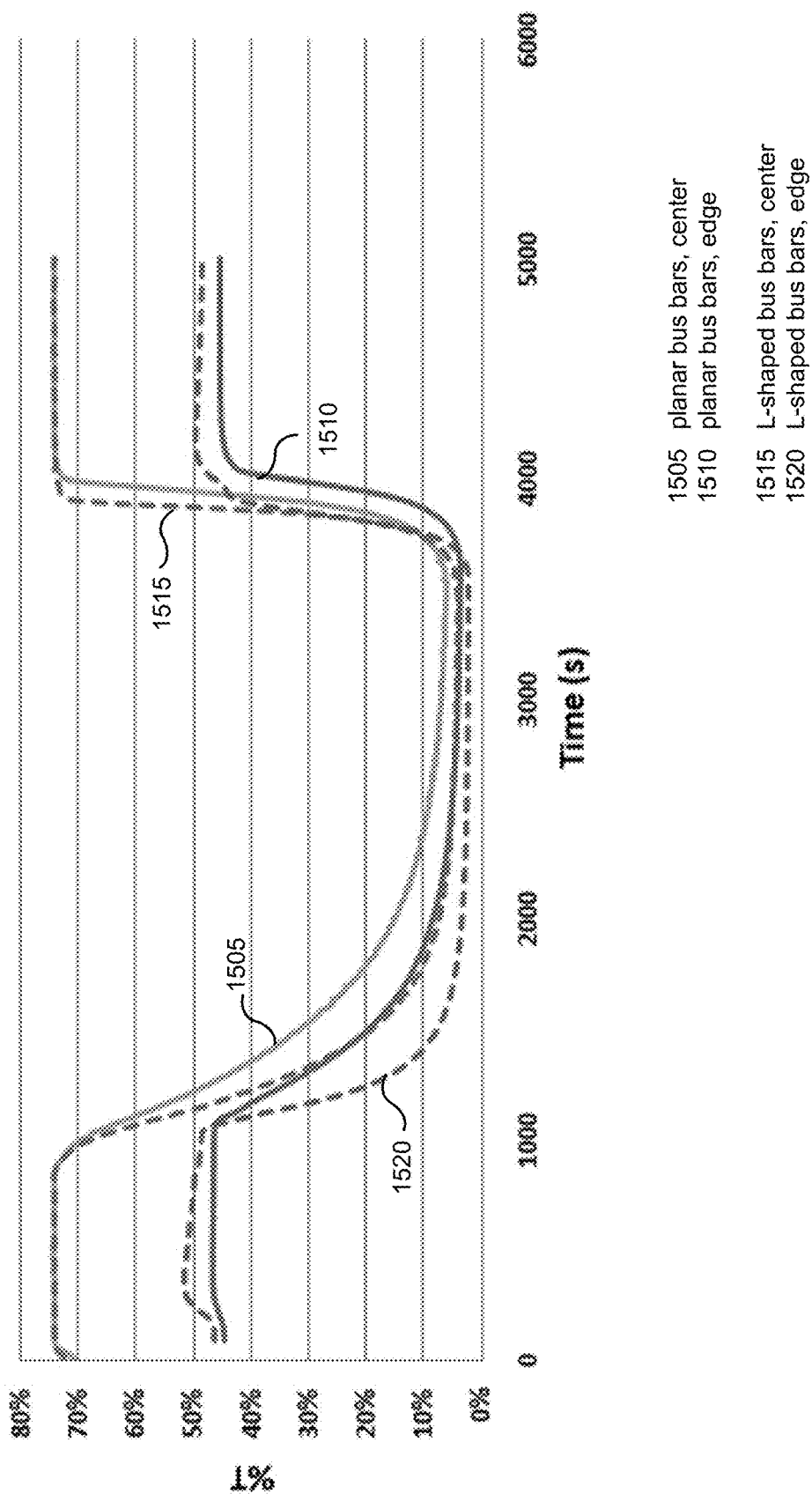
FIG. 15 shows a graph including plots of the percent transmittance of an electrochromic lite with planar bus bars and an electrochromic lite with angled bus bars.
Figure 16A:
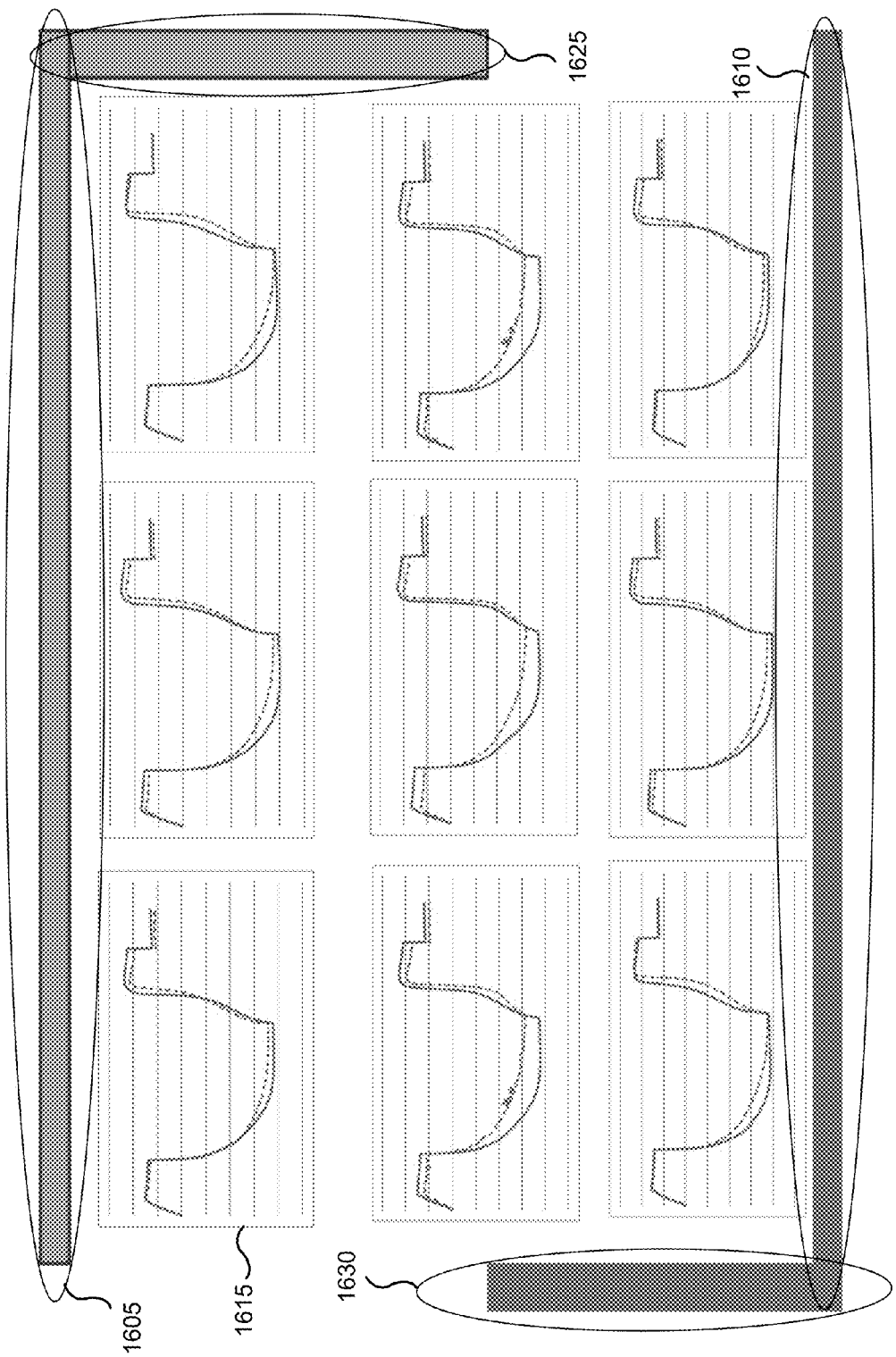
FIG. 16A shows a graph including plots of the voltage at different positions on a lower conductive electrode of an electrochromic lite.
Figure 16B:
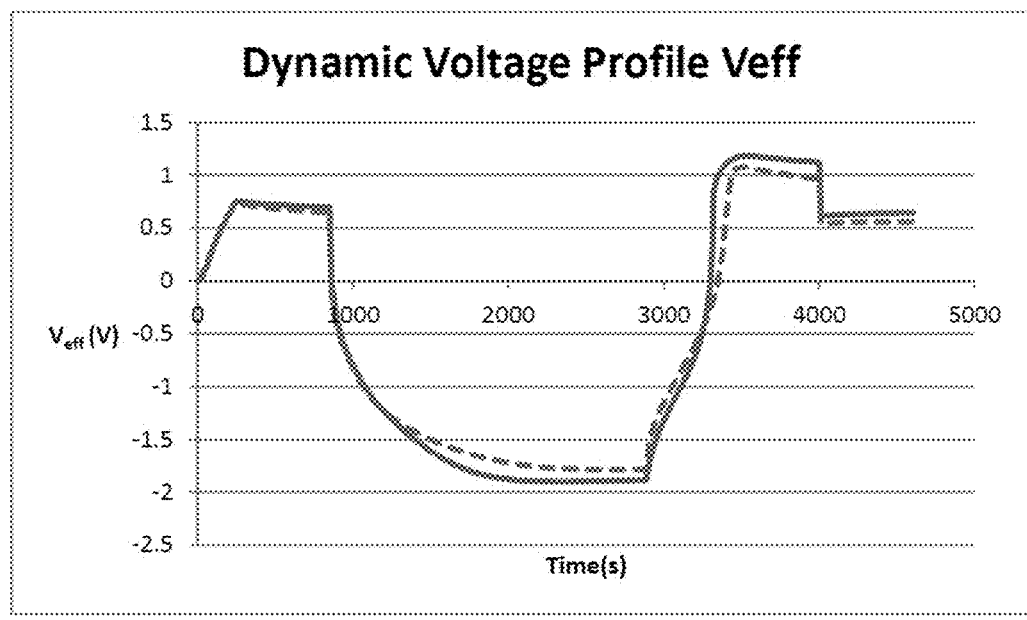
FIG. 16B shows an enlarged view of the plot from the upper left hand corner of FIG. 16A.
Figure 17:
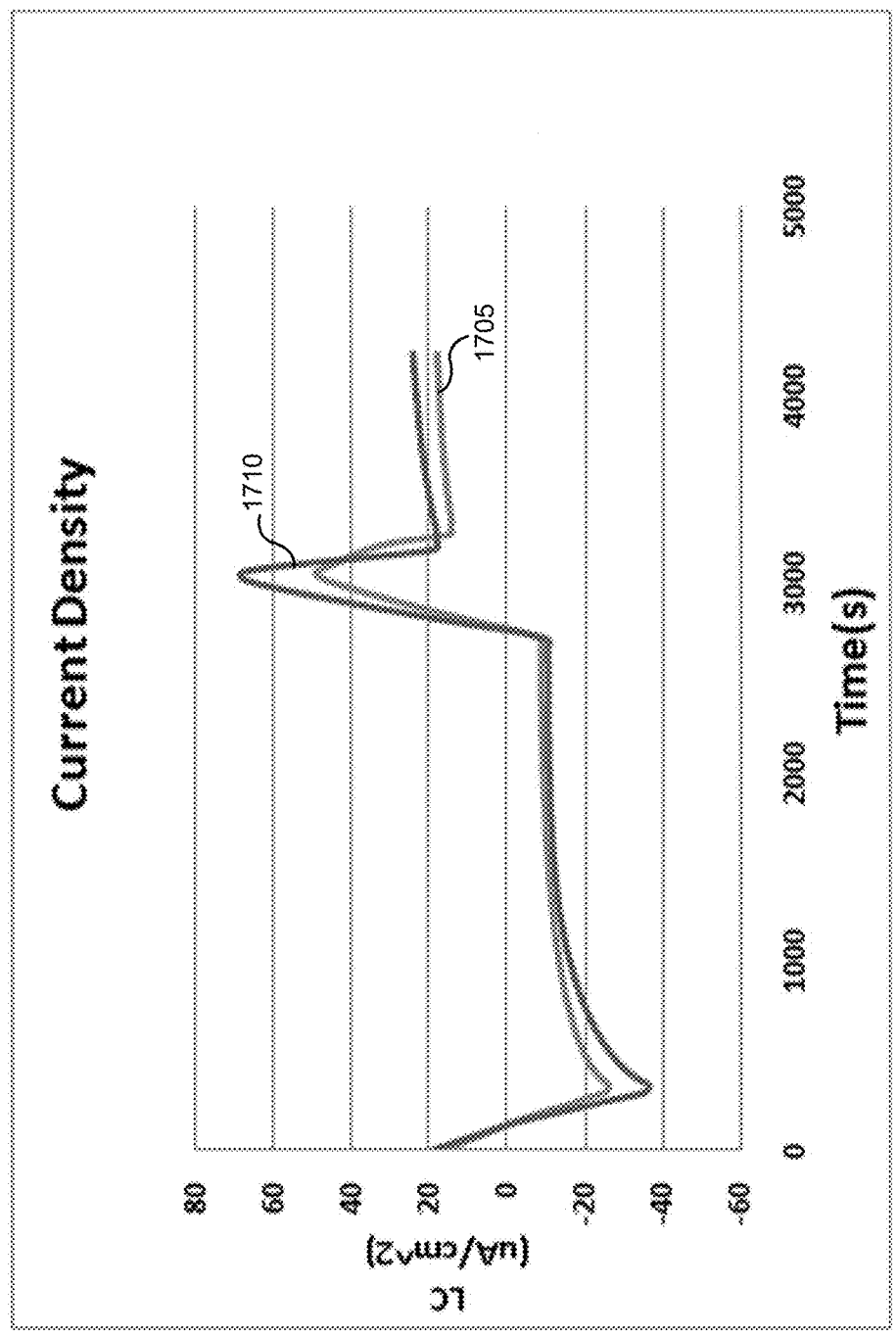
FIG. 17 shows a graph including plots of the current density in an electrochromic lite with planar bus bars and an electrochromic lite with angled bus bars.

FIGS. 15-17 show graphs including plots showing the performance of planar bus bars as compared to angled bus bars. FIG. 15 shows a graph including plots of the percent transmittance of an electrochromic lite with planar bus bars and an electrochromic lite with angled bus bars. FIG. 16A shows a graph including plots of the voltage at different positions on a lower conductive electrode of an electrochromic lite. FIG. 17 shows a graph including plots of the current density in an electrochromic lite with planar bus bars and an electrochromic lite with angled bus bars.

To generate these data, a tempered 26 inch×30 inch glass lite, having a sodium diffusion barrier and fluorinated tin oxide transparent conducting layer, was first coated with an all solid state and inorganic EC device, as described in U.S. patent application Ser. No. 12/772,055, filed Apr. 30, 2010, U.S. patent application Ser. No. 12/772,075, filed Apr. 30, 2010, U.S. patent application Ser. No. 12/814,277, filed Jun. 11, 2010, U.S. patent application Ser. No. 12/814,279, filed Jun. 11, 2010, and U.S. patent application Ser. No. 13/166,537, filed Jun. 22, 2011, all of which are incorporated by reference herein for all purposes. Prior to deposition, a laser isolation scribe (L1), penetrating the fluorinated tin oxide layer, was formed along the entire length of one of the 26" sides of the substrate, approximately ⅝" in from the glass edge. After the EC device coating was deposited, two laser scribes (L2) were formed, down to the glass, one each along the 30" sides of the lite, each scribe ⅝" from the glass edge. Another laser scribe (L3), parallel to L1, was formed along the other 26" side opposite L1 and ⅝" from glass edge. Between the L1 and the nearest parallel glass edge, an ultrasonic soldered bus bar was fabricated approximately the length of the edge to give a conductive path to the top conductive layer with isolation from the bottom conductive layer due to the L1 scribe. Similarly, a soldered bus bar was placed between the L3 and the nearest parallel glass edge to allow for a conductive path to the bottom conductive layer with isolation from the top conductive layer due to the L3 scribe. This yielded a 26"×30" lite with an active area of 24¾"×28¾" and a planar bus bar configuration (two parallel bus bars running along opposite edges of the lite).

The device was then run through a full coloration and bleaching cycle using a combined technique of cyclic voltammetry-chronocoulometry (CVCC). During cycling, the device was monitored near the center of the active area (plot 1505 in FIG. 15) midway between the L1 and L3 scribes with a light source/detector pair. An edge of the device was monitored (plot 1510 in FIG. 15) with this configuration as well. The center is the area seen to switch slowest on an electrochromic device with the aforementioned construction. This is due to the current drop off across the device due to the sheet resistance of the transparent electrode layers. The instrumentation used for measurement was an Ocean Optics Tungsten Halogen source and ThorLabs amplified silicon detector.

The device was also probed for voltage against the voltage of the bus bar connected to the lower transparent electrode, in a 9 location grid (3×3 matrix) on the active area of the device, as shown in the graphs in FIG. 16A. The 9 points making up the 3×3 matrix were: a point near the top transparent electrode bus bar (i.e., bus bar, 1605, in FIG. 16), a point midway between the bus bars, and a point near the lower transparent electrode bus bar (i.e., bus bar, 1610, in FIG. 16A), each of these three points taken at positions near each of the 30" edges of the lite and midway between the 30" edges of the lite. Each of the graphs shown in FIG. 16A corresponds to one of these points; the graphs are arranged between bus bars 1605 and 1610 in the manner that the device was probed.

The device was driven by an Arbin BT2000 battery tester which cycled the device as well as monitored the auxiliary voltage signals for the optical and voltage measurements. The parameters for the cycling algorithm were:
1. +4 mV/s ramp from 0V to 1V
2. 1V hold for 10 min
3. Ramp from 1V to −1.3 V @−500 mV/s
4. Ramp from −1.3V to −2.5V @−6 mV/s
5. Hold at −2.5V for 30 min
6. Ramp at +500 mV/s to 0V
7. Ramp at +4 mV/s to 2V
8. 2V hold for 10 min
9. 1V hold for 10 min The solid lines in the plots are the results of these tests, plotted as voltage versus time. FIG. 16B shows an enlarged view of the graph from the upper left hand corner of FIG. 16A (i.e., graph 1615), for reference.

Following the initial test, an additional L3 scribe was formed ½" inside one of the L2 scribes, perpendicular to the original L3, configured so that the bus bur electrically connected to the lower transparent conducting layer could be extended along the 30" side, in an angled configuration (approximately 90 degree angle in this example, and having a "L-shape"). This bus bar was extended with solder that extended approximately halfway across the 30" edge of the lite (extension 1625 of bus bar 1605)

The bus bar electrically connected to the top transparent conducting layer was not extended as described above, but rather replaced by a similar L-shaped bus bar that extended down the L1 side of the lite, just inside the old bus bar, and halfway across the 30" side of the lite, opposite the leg of the first L-shaped bus bar and adjacent to the L2 scribe (extension 1630 of bus bar 1610). This bus bar was constructed of copper tape, as ultrasonic solder here would result in an undesirable shunt in the active area of the device. This is because this bus bar resides inside the first bus bar, on the device side of the L1 isolation scribe, and therefore must not penetrate the device stack.

The device was monitored in the same manner at the same locations described in the setup above. That is, the device was run through a full coloration and bleaching cycle using a combined technique of CVCC. During cycling, the device was monitored near the center of the active area (plot 1515 in FIG. 15) midway between the L1 and L3 scribes with a light source/detector pair. An edge of the device was monitored (plot 1520 in FIG. 15), with this configuration as well. The device was also probed for voltage against the voltage of the bus bar connected to the lower transparent electrode, in a 9 location grid (3×3 matrix) on the active area of the device, as shown in the graphs in FIG. 16A. The dotted lines in the graphs are the results of these tests, plotted as voltage versus time. Again, FIG. 16B shows an enlarged view of the graph from the upper left hand corner (i.e., graph 1615), for reference.

The L-shaped bus bar configuration significantly improved coloration and bleaching time across the device. One common metric for characterizing switching speed of an electrochromic device is $t_{80\%}$, or time for the device to reach 80% of its coloration in optical density (OD). For the planar bus bar arrangement, the center and edge $t_{80\%}$ were 38.5 minutes and 22.2 minutes, respectively. With the L-shaped bus bars, the times decreased to 21.5 minutes and 11.5 minutes, respectively, with the larger percent increase occurring at the edge. Moreover, the device range increased and became more uniform with the improved bus bar configuration. Center OD range increased from 1.07 to 1.26 and edge OD range went from 1.08 to 1.35. The improved coloration can be seen in the I-V curve of the CVCC test (FIG. 15) which is a good proxy for measuring switching performance. As shown in FIG. 17, the device's leakage current changed minimally, while the peak current increased by a factor of about 1.4; plot 1705 is the current density with the planar bus bars, and plot 1710 is the current density with the L-shaped bus bars. The greater increase in peak current density signifies an improvement in ion movement and hence faster coloration. The voltage profile (FIG. 16A) as measured across the device showed improvement in all locations. Voltages switched the device not only faster, but with a larger, more uniform range.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. An apparatus comprising:
   a substrate;
   an optically switchable device coating disposed on a surface of the substrate and having a perimeter comprising a first corner and a region of the perimeter separate from the first corner, the first corner including a first vertex joining a first side and a second side;
   a first bus bar affixed to one of two monolithic conductive layers of the optically switchable device coating proximate to the first corner, configured to operate at a first polarity, and configured to deliver current and/or voltage for driving switching of the optically switchable device coating, the first bus bar including a first arm and a second arm having a configuration that substantially follows the shape of the first side, the first vertex, and the second side of the first corner, wherein the first arm of the first bus bar has a length of 10% to 65% of a length of the first side of the perimeter of the optically switchable device coating and the second arm of the first bus bar has a length of 10% to 65% of a length of the second side of the perimeter of the optically switchable device coating; and
   a second bus bar affixed to the other of the two conductive layers of the optically switchable device coating, the second bus bar configured to operate at a second polarity opposite the first polarity, and configured to deliver current and/or voltage for driving switching of the optically switchable device coating, and the second bus bar substantially following the region of the perimeter separate from the first corner such that the first and second bus bars of opposite polarity do not overlap, wherein the region of the perimeter separate from the first corner comprises a second corner including a second vertex joining a third side and a fourth side, wherein the second bus bar is affixed to the optically switchable device coating proximate to the second corner, wherein the second bus bar includes a third arm and a fourth arm having a configuration that substantially follows the shape of the third side, the second vertex, and the fourth side of the second corner of the perimeter of the optically switchable device coating, and wherein the third arm of the second bus bar has a length of 10% to 65% of a length of the third side of the perimeter of the optically switchable device coating and the fourth arm of the second bus bar has a length of 10% to 65% of a length of the fourth side of the perimeter of the optically switchable device coating; and
   wherein the optically switchable device coating is configured to be controlled by current and/or voltage delivered by the first and second bus bars, and
   wherein the first and second bus bars are configured to cause switching throughout the optically switchable device coating to a substantially uniform optical state in response to current and/or voltage being applied to the first and second bus bars.

2. The apparatus of claim 1, wherein the first bus bar and the second bus bar comprise arms of equal length, and wherein the first and second bus bars comprise a symmetrical relationship to one another.

3. The apparatus of claim 1, wherein the perimeter of the optically switchable device coating has a substantially rectangular shape or a substantially square shape.

4. The apparatus of claim 1, wherein the first arm of the first bus bar has a length about 35% to 65% of a length of the first side.

5. The apparatus of claim 1, wherein the first arm of the first bus bar has a length about 10% to 40% of a length of the first side.

6. The apparatus of claim 1,
   wherein the region of the perimeter separate from the first corner comprises a second corner including the second side, a second vertex joining the second side and a third side,
   wherein the first bus bar further includes a third arm, and
   wherein the second arm and the third arm have a configuration that substantially follows the shape of the second side, the second vertex, and the third side of the second corner.

7. The apparatus of claim 1, wherein the first bus bar and the second bus bar are configured such that the optically switchable device coating switches from a first optical state to the substantially uniform optical state in about 10 minutes or less.

8. The apparatus of claim 1, wherein the optically switchable device coating includes an electrochromic device that is solid state and inorganic.

9. The apparatus of claim 1, wherein the first bus bar and the second bus bar are L-shaped or V-shaped.

10. The apparatus of claim 1, wherein the first bus bar and the second bus bar are non-penetrating bus bars.

11. A method of changing an optical state of an optically switchable device coating disposed on a surface of a substrate and having a perimeter comprising a first corner and a region of the perimeter separate from the first corner, the first corner including a first vertex joining a first side and a second side, the method comprising:
   (a) applying current and/or voltage of a first polarity to a first bus bar affixed to one of the two monolithic conductive layers of the optically switchable device coating proximate to the first corner, the first bus bar including a first arm and a second arm having a configuration that substantially follows the shape of the first side, the first vertex, and the second side of the first corner of the perimeter, wherein the first arm of the first bus bar has a length of 10% to 65% of a length of the first side of the perimeter of the optically switchable device coating, wherein the second arm of the first bus bar has a length of 10% to 65% of a length of the second side of the perimeter of the optically switchable device coating;
   (b) applying current and/or voltage of a second polarity to a second bus bar affixed to the other of the two conductive layers of the optically switchable device coating and substantially following the region of the perimeter separate from the first corner such that the first and second bus bars of opposite polarity do not overlap, wherein the second polarity is opposite the first polarity, wherein the region of the perimeter separate from the first corner comprises a second corner including a second vertex joining a third side and a fourth side, wherein the second bus bar is affixed to the optically switchable device coating proximate to the second corner, wherein the second bus bar includes a third arm and a fourth arm having a configuration that substantially follows the shape of the third side, the second vertex, and the fourth side of the second corner of the perimeter of the optically switchable device coating, wherein the third arm of the second bus bar has a length of 10% to 65% of a length of the third side of the perimeter of the optically switchable device coating and the fourth arm of the second bus bar has a length of 10% to 65% of a length of the fourth side of the perimeter of the optically switchable device coating; and (c) in response to current and/or voltage applied to the first and the second bus bars, switching the optical state of the optically switchable device coating, wherein the current and/or voltage is delivered to the optically switchable device coating by the first and second bus bars, which are configured for the switching to occur throughout the optically switchable device coating to a substantially uniform optical state.

12. The method of claim 11, wherein switching the optical state of the optically switchable device coating from a first optical state to the substantially uniform optical state is performed in about 10 minutes or less.

13. The method of claim 11, wherein the optically switchable device coating is an electrochromic device that is solid state and inorganic.

14. The method of claim 13, wherein switching the optically switchable device coating changes the optically switchable device between a bleached state and a colored state.

15. The method of claim 11, wherein switching the optical state of the optically switchable device coating is performed such that current and/or voltage applied across the optically switchable device coating does not damage the optically switchable device coating.

16. The method of claim 11, wherein the first bus bar and the second bus bar are L-shaped or V-shaped.

17. The method of claim 11, wherein the first bus bar and the second bus bar are non-penetrating bus bars.

18. A method of fabricating an optically switchable device coating, the method comprising:

fabricating the optically switchable device coating on a surface of a substrate in a single integrated vacuum deposition system, the substrate being in a substantially vertical orientation in the integrated vacuum deposition system, the optically switchable device coating having a perimeter comprising a first corner and a region of the perimeter separate from the first corner, the first corner including a first vertex joining a first side and a second side; and forming a first bus bar on one of the two monolithic conductive layers of the optically switchable device coating proximate to the first corner of the perimeter, the first bus bar including a first arm and a second arm having a configuration that substantially follows the shape of the first side, the first vertex, and the second side of the first corner, the first bus bar being configured to deliver current and/or voltage of a first polarity for driving switching of the optically switchable device coating, the first arm of the first bus bar having a length of 10% to 65% of a length of the first side of the perimeter of the optically switchable device coating, wherein the second arm of the first bus bar has a length of 10% to 65% of a length of the second side of the perimeter of the optically switchable device coating; and forming a second bus bar on the other of the two conductive layers of the optically switchable device coating, the second bus bar configured to deliver current and/or voltage of a second polarity for driving switching of the optically switchable device coating, wherein the second polarity is opposite the first polarity, wherein the second bus bar substantially follows the region of the perimeter separate from the first corner such that the first and second bus bars of opposite polarity do not overlap, wherein the region of the perimeter separate from the first corner comprises a second corner including a second vertex joining a third side and a fourth side, wherein the second bus bar is affixed to the optically switchable device coating proximate to the second corner, wherein the second bus bar includes a third arm and a fourth arm having a configuration that substantially follows the shape of the third side, the second vertex, and the fourth side of the second corner of the perimeter of the optically switchable device coating, wherein the third arm of the second bus bar has a length of 10% to 65% of a length of the third side of the perimeter of the optically switchable device coating and the fourth arm of the second bus bar has a length of 10% to 65% of a length of the fourth side of the perimeter of the optically switchable device coating, wherein the optically switchable device coating is configured to be controlled by current and/or voltage delivered by the first and second bus bars, wherein the first and second bus bars are configured to cause switching throughout the optically switchable device coating to a substantially uniform optical state in response to current and/or voltage being applied to the first and second bus bars.

19. An electrochromic device comprising:

a rectangular substrate;

an electrochromic device coating, disposed on the rectangular substrate, and comprising one or more electrochromic material layers sandwiched between two transparent conductor layers;

a first angled bus bar, on and in electrical communication with, one of the two transparent conductor layers, the first angled bus bar disposed along a first corner of the rectangular substrate, the first angled bus bar configured to supply electrical energy of a first polarity to the one of the transparent conductor layers; and a second angled bus bar, on and in electrical communication with, the other of the two transparent conductor layers, the second angled bus bar disposed along a second corner, diagonally opposed to the first corner, of the rectangular substrate, the second angled bus bar configured to supply electrical energy of a second polarity, opposite the first polarity, to the other of the two transparent conductor layers;

wherein each arm of the first and second angled bus bar comprises a length that is between 10% and 65% of the length of the side of the rectangular substrate on which it resides and the first and second angled bus bars do not overlap each other, wherein the first and second angled bus bars are configured to cause switching throughout the electrochromic device coating to a substantially uniform optical state in response to current and/or voltage being applied to the first and second angled bus bars.

20. The electrochromic device of claim 19, wherein the first angled bus bar and the second angled bus bar are L-shaped or V-shaped.

21. The electrochromic device of claim 19, wherein the first angled bus bar and the second angled bus bar have arms that are in symmetrical relationship to another and each of the first and second angled bus bars has arms of equivalent length.

22. The electrochromic device of claim 19, wherein each arm of the first and second angled bus bar comprises a length that is between 35% and 65% of the length of the side of the rectangular substrate on which it resides.

23. The electrochromic device of claim 19, wherein the electrochromic device coating is solid state and inorganic.

24. The electrochromic device of claim 19, wherein the electrochromic device coating is solid state and inorganic.

25. The electrochromic device of claim 19, wherein the first bus bar and the second bus bar are non-penetrating bus bars.

* * * * *